(12) United States Patent
Tsai et al.

(10) Patent No.: US 8,722,755 B2
(45) Date of Patent: May 13, 2014

(54) PHOTOSENSITIVE RESIN COMPOSITION AND USES THEREOF

(71) Applicant: Chi Mei Corporation, Tainan (TW)

(72) Inventors: Yu-Jie Tsai, Tainan (TW); Ming-Ju Wu, Tainan (TW)

(73) Assignee: Chi Mei Corporation, Tainan City (TW)

( * ) Notice: Subject to any disclaimer, the term of this patent is extended or adjusted under 35 U.S.C. 154(b) by 0 days.

(21) Appl. No.: 13/780,362

(22) Filed: Feb. 28, 2013

(65) Prior Publication Data

US 2013/0245150 A1 Sep. 19, 2013

(30) Foreign Application Priority Data

Mar. 16, 2012 (TW) .............................. 101108984 A

(51) Int. Cl.
- C08F 2/50 (2006.01)
- C08F 2/46 (2006.01)
- B29C 71/04 (2006.01)
- A61L 2/08 (2006.01)
- A61L 24/00 (2006.01)
- C08G 61/04 (2006.01)

(52) U.S. Cl.
USPC .......... 522/39; 522/33; 522/6; 522/1; 522/71; 522/189; 522/184; 520/1

(58) Field of Classification Search
USPC ............. 522/39, 33, 6, 1, 71, 189, 184; 520/1
See application file for complete search history.

(56) References Cited

FOREIGN PATENT DOCUMENTS

| JP | 2004-240241 | | 8/2004 |
|----|-------------|---|--------|
| JP | 2006-058385 | * | 3/2006 |
| JP | 2006-163415 | * | 6/2006 |
| JP | 2008-233518 | | 10/2008 |
| JP | 2010-054561 | | 3/2010 |
| JP | 2011-141538 | * | 7/2011 |
| TW | 200937123 | | 9/2009 |

OTHER PUBLICATIONS

Chiantore, Oscar, GPC/SEC: Calibration with Universal Calibration Techniques, 2009, The Encyclopedia of Chromatography, 3rd Edition, 1006-1007.*

Office Action of counterpart TW Application No. 101108984 dated Nov. 29, 2013 citing: JP2008-233518 and TW200937123.

English Translation of Abstracts of JP2008-233518 and TW200937123.

* cited by examiner

*Primary Examiner* — Ling Choi
*Assistant Examiner* — Jessica E Whiteley
(74) *Attorney, Agent, or Firm* — WPAT, P.C.; Anthony King

(57) ABSTRACT

The invention relates to a photosensitive resin composition, and an overcoat and/or spacer for a liquid crystal display component formed thereby has good heat-resistant transmittance, good chemical resistance and good elastic recovery rate. The invention also provides a method for forming a thin film on a substrate, a thin film on a substrate and a liquid crystal display component.

14 Claims, No Drawings

PHOTOSENSITIVE RESIN COMPOSITION AND USES THEREOF

BACKGROUND OF THE INVENTION

1. Field of the Invention

The invention relates to a photosensitive resin composition, an overcoat or a spacer formed by the composition and a liquid crystal display component. Particularly, the invention provides a product having good heat-resistant transmittance, good chemical resistance and good elastic recovery rate manufactured with the photosensitive resin composition and uses thereof.

2. Description of the Related Art

In the manufacturing process of a liquid crystal display component, forming an overcoat or a spacer on a substrate is an important step.

Demanding procedures under harsh conditions are required for manufacturing a liquid crystal display component or a solid-state imaging device, etc. For example, local high temperature occurs when processing by infusion with an acid solvent or alkaline solvent on the surface of substrate or by sputtering to form a wiring electrode layer. Thus, an overcoat is needed to be laid on these components to prevent them from damage. To enable the overcoat to resist the aforementioned processing, an excellent adhesive force between the overcoat and substrate is required, along with a surface of high transparency, high hardness and smoothness; furthermore, high heat resistance and light resistance could prevent the overcoat from deteriorations including: discoloration, yellowing or whitening, etc. Moreover, good water-proofing and strong resistance to chemicals, solvents, acid and alkali, etc, of the overcoat is also required.

On the other hand, to maintain an interlayer spacing (intercellular space) between two substrates in conventional colored liquid crystal display components, polystyrene beads or silica beads are randomly sprayed on the entire substrate, of which the diameter of the beads is the spacing between two substrates. However, uneven positioning and density distribution of the beads causes scattering of the backlight and further reducing the contrast of the display components. Therefore, a photosensitive composition for the spacer developed by photolithography becomes the mainstream in this field. The spacer is formed by coating the photosensitive composition for a spacer on the substrate, and placing a designated-shaped photomask between the substrate and the exposure source; then by development after exposure, a spacer is formed on a designated position outside the effective pixel to solve the problems in the prior art. The intercellular space is also controlled by the cell thickness formed by the photosensitive composition, enabling to control its spacing with high accuracy.

Nowadays, the overcoat and spacer are generally made of photosensitive resin by means of coating, exposure and developing, etc.

As the overcoat or spacer is formed on a colored filter or substrate, an extremely high transparency is required. When the overcoat or spacer with poor transparency is applied to a liquid crystal display component, inadequate luminance of the liquid crystal display component is caused, thus affecting its display quality.

To improve the transparency of the overcoat or spacer, Japanese Patent Publication No. 2010-054561 disclosed a photosensitive composition for an overcoat, comprising: an alkali-soluble bonding resin (A); an ethylenically unsaturated compound (B); a light initiator (C); and a solvent (D); wherein the bonding equivalent of the unsaturated bond in the ethylenically unsaturated compound (B) is between 90 and 450 g/eq, and the amount of unsaturated double bond of a single compound is between 2 and 4 in the ethylenically unsaturated compound (B); and the average molecular weight of the alkali-soluble bonding resin (A) is between 10,000 and 20,000. Additionally, Japanese Patent Publication No. 2004-240241 has disclosed a photosensitive composition comprising: a copolymer (A), which is polymerized by an ethylenically unsaturated carboxyl (anhydride), an ethylenically unsaturated compound containing an epoxy group and other unsaturated ethenyl compounds; an ethylenically unsaturated ethenyl polymer (B); and a photoinitiator (C). The photoinitiator (C) is 2-butanedione-[-4-methylthio benzene]-2-(O-oxime acetate), 1,2-butanedione-1-(−4-morpholino phenyl)-2-(O-benzoyl oxime), 1,2-octadione-1-[4-thiophenyl benzene]-2-[O-(4-methyl benzoyl)oxime] or its analogue. Though the photosensitive composition is able to fabricate an overcoat or spacer of high transparency, it presents the poor heat-resistant transmittance. In addition, the fabricated overcoat features poor chemical resistance and the spacer features poor elastic recovery in use.

Therefore, a photosensitive that enhancing the heat-resistant transmittance, chemical resistance, elastic recovery rate and transparency of the overcoat and spacer at the same time is a target remained to be achieved for the cost concern.

SUMMARY OF THE INVENTION

In the present invention, the specific contents is provided to obtain a photosensitive resin composition for an overcoat and spacer having the good heat-resistant transmittance, chemical resistance, elastic recovery rate and transparency at the same time.

Therefore, the invention relates to a photosensitive resin composition comprising:
  an alkali-soluble resin (A);
  a polysiloxane (B)
  a compound having an ethylenically unsaturated group (C); and
  a photoinitiator (D);
  wherein said polysiloxane (B) contains 20 wt % to 60 wt % of a polysiloxane fraction having a molecular weight ranging from 5,000 to 50,000 based on a total weight of said polysiloxane (B) and said polysiloxane (B) contains 0.001 wt % to 7 wt % of a polysiloxane fraction having a molecular weight below 500 based on a total weight of said polysiloxane (B) when calculated from an integral molecular weight distribution curve obtained by plotting cumulative weight percentage versus molecular weight falling within a range between 400 and 100,000 measured by gel permeation chromatography.

The present invention also provides a method for forming a thin film on a substrate comprising applying the photosensitive resin composition as mentioned above on the substrate; preferably, the thin film is an overcoat or a spacer.

The present invention also provides a thin film on a substrate, which is obtained by the method as mentioned above.

The present invention further provides a liquid crystal display component comprising the thin film as mentioned above

DETAILED DESCRIPTION OF THE INVENTION

The invention relates to a photosensitive resin composition comprising:
  an alkali-soluble resin (A);
  a polysiloxane (B)

a compound having an ethylenically unsaturated group (C); and a photoinitiator (D);

wherein said polysiloxane (B) contains 20 wt % to 60 wt % of a polysiloxane fraction having a molecular weight ranging from 5,000 to 50,000 based on a total weight of said polysiloxane (B) and said polysiloxane (B) contains 0.001 wt % to 7 wt % of a polysiloxane fraction having a molecular weight below 500 based on a total weight of said polysiloxane (B) when calculated from an integral molecular weight distribution curve obtained by plotting cumulative weight percentage versus molecular weight falling within a range between 400 and 100,000 measured by gel permeation chromatography.

The wording "(meth)acrylic acid" used herein indicates acrylic acid and/or methacrylic acid; "(meth)acryloyl" indicates acryloyl and/or methacryloyl; and "(meth)acrylate" indicates acrylate and/or methacrylate.

The alkali-soluble resin (A) according to the present invention refers to a resin which can be dissolved in an alkali aqueous solution, with its structure not particularly limited. In the preferred embodiment of the present invention, the alkali-soluble resin (A) refers to a resin containing a carboxylic acid and phenol-novolac resin, etc. More preferably, said alkali-soluble resin (A) is polymerized with an unsaturated carboxylic acid or unsaturated carboxylic acid anhydride compound (a1), an unsaturated compound containing an epoxy group (a2), and/or an other unsaturated compound (a3) in a solvent with an appropriate polymerization initiator.

The preferred composition ratio of the unsaturated carboxylic acid or unsaturated carboxylic acid anhydride compound (a1) according to the present invention is 5 to 50 parts by weight. The unsaturated carboxylic acid or unsaturated carboxylic acid anhydride compound (a1) refers to a compound containing carboxylic acid or carboxylic acid anhydride structure and unsaturated bond for polymerization, with its structure not particularly limited, e.g., an unsaturated monocarboxylicacid compound, an unsaturated dicarboxylic acid compound, an unsaturated anhydride compound, a polycyclic unsaturated carboxylic acid compound, a polycyclic unsaturated dicarboxylic acid compound, and a polycyclic unsaturated anhydride compound.

In one embodiment of the present invention, the unsaturated monocarboxylic acid compound refers to (meth)acrylic acid, butenoic acid, α-chloroacrylic acid, ethyl acrylic acid, cinnamic acid, 2-(meth)acryloyloxyethyl succinate, 2-(meth)acryloyloxyethyl hexahydrophthate, 2-(meth)acryloyloxyethyl phthate, and omega-carboxyl polycaprolactone polyol monoacrylic acid (trade name as ARONIX M-5300, made by Toagosei).

In one embodiment of the present invention, the unsaturated dicarboxylic acid compound refers to maleic acid, fumaric acid, methyl fumaric acid, itaconic acid, and citraconic acid, etc. In one embodiment of the present invention, the unsaturated dicarboxylic acid anhydride compound refers to an anhydride compound of said unsaturated dicarboxylic acid compound.

In one embodiment of the present invention, the polycyclic unsaturated carboxylic acid compound refers to 5-carboxyl-bicyclo[2.2.1]hept-2-ene, 5-carboxyl-5-methylbicyclo[2.2.1]hept-2-ene, 5-carboxyl-5-ethylbicyclo[2.2.1]hept-2-ene, 5-carboxyl-6-methylbicyclo[2.2.1]hept-2-ene, and 5-carboxyl-6-ethylbicyclo[2.2.1]hept-2-ene.

In one embodiment of the present invention, the polycyclic unsaturated dicarboxylic acid compound refers to the 5,6-dicarboxylicbicyclo[2.2.1]hept-2-ene. In one embodiment of the present invention, the polycyclic unsaturated dicarboxylic acid anhydride compound refers to an anhydride compound of said polycyclic unsaturated dicarboxylic acid compound.

In one embodiment of the present invention, the unsaturated carboxylic acid or unsaturated carboxylic acid anhydride compound (a1) refers to acrylic acid, methacrylic acid, maleic anhydride, 2-methacrylethoxyl succinic acid, and 2-methacrylethoxyl hexahydrophthalic acid. The unsaturated carboxylic acid or unsaturated carboxylic acid anhydride compound (a1) can be used independently or mixedly.

The preferred composition ratio of the unsaturated compound containing an epoxy group (a2) according to the present invention is 10 to 70 parts by weight. Examples of the unsaturated compound containing an epoxy group (a2) are as follows: (meth)acrylate compound containing an epoxy group, α-alkyl acrylate compound containing an epoxy group, and epoxypropyl ether.

In one embodiment of the present invention, the (meth)acrylate compound containing an epoxy group refers to epoxypropyl (meth)acrylate (glycidyl (meth)acrylate), 2-methyl epoxypropyl (meth)acrylate, 3,4-epoxybutyl (meth)acrylate, 6,7-epoxyheptyl (meth)acrylate, 3,4-epoxycyclohexyl (meth)acrylate, and 3,4-epoxycyclohexylmethyl (meth)acrylate.

In one embodiment of the present invention, the α-alkyl acrylate compound containing an epoxy group refers to α-ethyl epoxypropyl acrylate, α-n-propyl epoxypropyl acrylate, α-n-butyl epoxypropyl acrylate, and α-ethyl 6,7-epoxyheptyl acrylate.

In one embodiment of the present invention, the epoxypropyl ether refers to o-vinylbenzylglycidylether, m-vinylbenzylglycidylether), and p-vinylbenzylglycidylether.

The preferred embodiment of the present invention, the unsaturated compound containing an epoxy group (a2) refers to epoxypropyl (meth)acrylate (glycidyl (meth)acrylate), 3,4-epoxycyclohexylmethyl (meth)acrylate, 6,7-epoxyheptyl (meth)acrylate, o-vinylbenzylglycidylether, m-vinylbenzylglycidylether), and p-vinylbenzylglycidylether.

The preferred composition ratio of the other unsaturated compound (a3) is 0 to 70 parts by weight. Examples of said other unsaturated compound (a3) are alkyl (meth)acrylate, alicyclic (meth)acrylate, aryl (meth)acrylate, unsaturated dicarboxylic acid diester, hydroxyalkyl (meth)acrylate, polyether of (meth)acrylate, an aromatic ethylene compound, and other unsaturated compounds.

In one embodiment of the present invention, the alkyl (meth)acrylate refers to methyl (meth)acrylate, ethyl (meth)acrylate, n-propyl (meth)acrylate, isopropyl (meth)acrylate, n-butyl (meth)acrylate, isobutyl (meth)acrylate, dibutyl (meth)acrylate, and tert-butyl (meth)acrylate.

In one embodiment of the present invention, the alicyclic (meth)acrylate refers to cyclohexyl (meth)acrylate, 2-methyl cyclohexyl (meth)acrylate, tricyclic[$5.2.1.0^{2,6}$]decane-8-ol (meth)acrylate (also called dicyclopentanyl (meth)acrylate), bicyclic pentyloxy ethyl (meth)acrylate, isobornyl (meth)acrylate, and tetrahydrofuran (meth)acrylate.

In one embodiment of the present invention, the aryl (meth)acrylate refers to phenyl (meth)acrylate and benzyl (meth)acrlate.

In one embodiment of the present invention, the unsaturated dicarboxylic acid diester refers to diethyl maleate, diethyl fumarate, and diethylitaconate.

In one embodiment of the present invention, the hydroxyalkyl refers to 2-hydroxyethyl (meth)acrylate and 2-hydroxypropyl (meth)acrylate.

In one embodiment of the present invention, the polyether of (meth)acrylate refers to polyethylene glycol mono(meth)acrylate and polypropylene glycol mono(meth)acrylate.

In one embodiment of the present invention, the aromatic ethylene compound refers to styrene, α-methylstyrene, m-methylstyrene, o-methylstyrene, and p-methoxy styrene.

In one embodiment of the present invention, other unsaturated compounds refer to acrylonitrile, methacrylonitrile, vinyl chloride, vinylidene chloride, acrylamide, methacrylamide, ethylacetate, 1,3-butadiene, isoprene, 2,3-dimethyl 1,3-butadiene, N-cyclohexylmaleimide, N-phenylmaleimide, N-benzylmaleimide, N-succinimidoyl-3-maleimidylbenzoate, N-succinimidoyl-4-maleimidylbutyrate, N-succinimidoyl-6-maleimidylhexanoate, N-succinimidoyl-3-maleimidylpropionate, and N-(9-acridinyl)maleimide.

The preferred embodiments of the other unsaturated compound (a3) are methyl (meth)acrylate, n-butyl (meth)acrylate, 2-hydroxyethyl (meth)acrylate, tert-butyl (meth)acrylate, phenmethylmethacrlate, bicyclic pentyloxy ethyl (meth)acrylate, styrene, and p-methoxystyrene. The other unsaturated compound (a3) according to the invention can be used independently or mixedly.

In one embodiment of the present invention, the solvent used for synthesizing the alkali-soluble resin (A) is an alcohol, ether, glycol ether, ethylene glycol alkyl ether acetate, diethylene glycol, dipropylene glycol, propylene glycol monoalkyl ether, propylene glycol alkyl ether acetate, propylene glycol alkyl ether propionate, aromatic hydrocarbon, ketone, and ester.

In one embodiment of the present invention, the alcohol refers to methanol, ethanol, benzyl alcohol, 2-phenylethanol, and 3-phenyl-1-propanol.

In one embodiment of the present invention, the ether refers to tetrahydrofuran.

In one embodiment of the present invention, the glycol ether refers to ethylene glycol monopropyl ether, ethylene glycol monomethyl ether, and ethylene glycol monoethyl ether.

In one embodiment of the present invention, the ethylene glycol alkyl ether acetate refers to ethylene glycol butyl ether acetate, ethylene glycol ethyl ether acetate, and ethylene glycol methyl ether acetate.

In one embodiment of the present invention, the diethylene glycol refers to diethylene glycol monomethyl ether, diethylene glycol monoethyl ether, diethylene glycol monobutyl ether, diethylene glycol dimethyl ether, diethylene glycol diethyl ethe, and diethylene glycol methylethyl ether.

In one embodiment of the present invention, the dipropylene glycol refers to dipropylene glycol monomethyl ether, dipropylene glycol monoethyl ether, dipropylene glycol dimethyl ether, dipropylene glycol diethyl ether, and dipropylene glycol methylethyl ether.

In one embodiment of the present invention, the propylene glycol monoalkyl ether refers to propylene glycol monomethyl ether, propylene glycol monoethyl ether, propylene glycol monopropyl ether and propylene glycol monobutyl ether.

In one embodiment of the present invention, the propylene glycol alkyl ether acetate refers to propylene glycol methyl ether acetate, propylene glycol ethyl ether acetate, propylene glycol propyl ether acetate, and propylene glycol butyl ether acetate.

In one embodiment of the present invention, the propylene glycol alkyl ether propionate refers to propylene glycol methyl ether propionate, propylene glycol diethyl ether propionate, propylene glycol propyl ether propionate, and propylene glycol butyl ether propionate.

In one embodiment of the present invention, the aromatic hydrocarbon refers to toluene and dimethylbenzene.

In one embodiment of the present invention, said ketone refers to methyl ethyl ketone, cyclohexanone and diacetone Alcohol.

In one embodiment of the present invention, said ester refers to methyl acetate, ethyl acetate, propyl acetate, butyl acetate, ethyl 2-hydroxy propionate, methyl 2-hydroxy-2-methyl propionate, ethyl 2-hydroxy-2-methyl propionate, methyl glycolate, ethyl glycolate, butyl glycolate, methyl lactate, propyl lactate, butyl lactate, methyl 3-hydroxy propionate, ethyl 3-hydroxy propionate, propyl 3-hydroxy propionate, butyl 3-hydroxy propionate, methyl 2-hydroxy-3-methyl butanoate, methyl methoxy acetate, ethyl methoxy acetate, butyl methoxy acetate, methyl ethoxy acetate, ethyl ethoxy acetate, propyl ethoxy acetate, butyl ethoxy acetate, methyl propoxy acetate, ethyl propoxy acetate, propyl propoxy acetate, butyl propoxy acetate, methyl butoxy acetate, ethyl butoxy acetate, propyl butoxy acetate, butyl butoxy acetate, butyl 3-methoxyl acetate, methyl 2-methoxy propionate, ethyl 2-methoxy propionate, propyl 2-methoxy propionate, butyl 2-methoxy propionate, methyl 2-ethoxy propionate, ethyl 2-ethoxy propionate, propyl 2-ethoxy propionate, butyl 2-ethoxy propionate, methyl 2-butoxy propionate, ethyl 2-butoxy propionate, propyl 2-butoxy propionate, butyl 2-butoxy propionate, methyl 3-methoxy propionate, ethyl 3-methoxy propionate, propyl 3-methoxy propionate, butyl 3-methoxy propionate, methyl 3-ethoxy propionate, ethyl 3-ethoxy propionate, propyl 3-ethoxy propionate, butyl 3-ethoxy propionate, methyl 3-propoxy propionate, ethyl 3-propoxy propionate, propyl 3-propoxy propionate, butyl 3-propoxy propionate, methyl 3-butoxy propionate, ethyl 3-butoxy propionate, propyl 3-butoxy propionate, and butyl 3-butoxy propionate.

In one preferred embodiment of the present invention, the solvent used for synthesizing the alkali-soluble resin (A) is diethylene dlycol dimethyl ether and propylene glycol methyl ether acetate. The solvent used for synthesizing the alkali-soluble resin (A) according to the invention can be used independently or mixedly.

Examples of the polymerization initiator used for synthesizing the alkali-soluble resin (A) according to the present invention are an azo compound or a peroxide.

Examples of said azo compound are 2,2-azodiisobutyronitrile, 2,2'-azobis(2,4-dimethylvaleronitrile), 2'-azobis(4-methoxy-2,4-dimethylvaleronitrile), 2,2'-azobis-2-methylbutyronitrile, 4,4'-azobis(4-cyanovaleric acid), dimethyl 2,2'-azobis(2-methyl propionate), and 2,2'-azobis(4-methoxyl-2,4-dimethylvaleronitrile).

Examples of said peroxide are benzoyl peroxide, dilauroyl peroxide, tert-butyl peroxypivalate, 1,1-di(tert-butylperoxy) cyclohexane, and hydrogen peroxide.

The polymerization initiator used for synthesizing the alkali-soluble resin (A) according to the present invention can be used independently or mixedly.

The average molecular weight of the alkali-soluble resin (A) according to the present invention is generally 3,000 to 100,000; preferably 4,000 to 80,000; more preferably 5,000 to 60,000. The molecular weight of the alkali-soluble resin (A) can be adjusted by using a single resin or two or more resins with different molecular weights.

There is no specific limitation to the structure of polysiloxane (B) according to the invention. In one preferred embodiment of the invention, the polysiloxane (B) is obtained by hydrolyzing and condensing a silane compound and/or a siloxane prepolymer; preferably, by partially condensing.

The polysiloxane (B) contains 20 wt % to 60 wt % of a polysiloxane fraction having a molecular weight ranging from 5,000 to 50,000 based on a total weight of said polysiloxane (B) and said polysiloxane (B) contains 0.001 wt % to 7 wt % of a polysiloxane fraction having a molecular weight below 500 based on a total weight of said polysiloxane (B) when calculated from an integral molecular weight distribution curve obtained by plotting cumulative weight percentage versus molecular weight falling within a range between 400 and 100,000 measured by gel permeation chromatography.

There is no specific limitation to the method of measuring the molecular weight. In one embodiment of the invention, the measurement condition for the gel permeation chromatography uses an apparatus of 717 plus (manufactured by Waters®), columns of 79911GP-501, 79911GP-502, 79911GP-503, and 79911GP-504 (manufactured by Agilent Technologies®), a detector of 2414 RI Detector (manufactured by Waters®), a mobile phase of tetrahydrofuran, a flow rate of 1.0 ml/min, a injection volume of 100 μL, a measurement temperature of 40° C., a measurement period of 60 minutes, and a molecular weight standard of polystyrene.

If the polysiloxane (B) contains more than 60 wt % of a polysiloxane fraction having a molecular weight ranging from 5,000 to 50,000 based on a total weight of said polysiloxane (B), the elastic recovery rate is not satisfactory. In another aspect, if the polysiloxane (B) contains less than 20 wt % of a polysiloxane fraction having a molecular weight ranging from 5,000 to 50,000 based on a total weight of said polysiloxane (B), the chemical resistance is not satisfactory.

This invention is not limited by theory, but it is believed that when the molecular weight is more than the range, the photoresist formed thereby is too hard, and the elastic recovery rate is not good; when the molecular weight is less then the range, the bond of the photoresist formed thereby is not compact, and the chemical resistance is not good.

If the polysiloxane (B) contains more than 7 wt % of a polysiloxane fraction having a molecular weight below 500 based on a total weight of said polysiloxane (B), the elastic recovery rate and chemical resistance is not satisfactory.

In another aspect, if the polysiloxane (B) contains less than 0.001 wt % of a polysiloxane fraction having a molecular weight below 500 based on a total weight of said polysiloxane (B), the cost is too high.

This invention is not limited by theory, but it is believed that when the content of the oligomers is too high, the shape of the pattern formed is not good, and the elastic recovery rate and the chemical resistance is not good.

In one preferred embodiment of the invention, the silane compound includes but is not limited to a structure represented by Formula (1);

$$Si(R^a)_z(OR^b)_{4-z} \qquad \text{Formula (1)}$$

wherein:
at least one of $R^a$ represents an alkyl group having a carboxylic acid anhydride substituent; and the other $R^a$ is independently selected from the group consisting of a hydrogen atom, a $C_1$-$C_{10}$ alkyl group, a $C_2$-$C_{10}$ alkenyl group, and a $C_6$-$C_{15}$ aryl group. The plural $R^a$s can be identical with or different from each other.

$R^b$ is independently selected from the group consisting of a hydrogen atom, a $C_1$-$C_6$ alkyl group, a $C_1$-$C_6$ acyl group, and a $C_6$-$C_{15}$ aryl group. The plural $R^b$s can be identical with or different from each other.

z represents an integer from 1 to 3.

In the compound represented by Formula (1), preferably, at least one of $R^a$ represents an alkyl group having a succinic acid anhydride substituent. Examples of the alkyl group having a carboxylic acid anhydride substituent are a methyl, ethyl, n-propyl, isopropyl, n-butyl, tert-butyl, n-hexyl, and n-decyl. In another aspect, the alkyl group, alkenyl group and aryl group of the other $R^a$ without a succinic acid anhydride substituent may be with or without a substituent depending on the feature needed. In one embodiment of the invention, in the other $R^a$ without a succinic acid anhydride substituent, the $C_1$-$C_{10}$ alkyl group is methyl, ethyl, n-propyl, isopropyl, n-butyl, tert-butyl, n-hexyl, n-decyl, trifluoromethyl, 2,2,2-trifluoroethyl, 3,3,3-trifluoropropyl, 3-aminopropyl, 3-mercaptopropyl, or 3-isocyanatopropyl; the $C_2$-$C_{10}$ alkenyl group is vinyl, 3-acryloxypropyl or 3-methacryloxypropyl; and the $C_6$-$C_{15}$ aryl group is phenyl, tolyl, p-hydroxyphenyl, 1-(p-hydroxyphenyl)ethyl, 2-(p-hydroxyphenyl)ethyl, 4-hydroxy-5-(p-hydroxyphenylcarbonyloxy)pentyl, or naphthyl.

In the compound represented by Formula (1), $R^b$ is independently selected from the group consisting of a hydrogen atom, a $C_1$-$C_6$ alkyl group, a $C_1$-$C_6$ acyl group, and a $C_6$-$C_{15}$ aryl group. The plural $R^b$s can be identical with or different from each other. The alkyl group, acyl group and aryl group may be with or without a substituent depending on the feature needed. In one embodiment of the invention, in $R^b$, the $C_1$-$C_6$ alkyl group is methyl, ethyl, n-propyl, isopropyl, or n-butyl; the $C_1$-$C_6$ acyl group is acetyl; and the $C_6$-$C_{15}$ aryl group is phenyl.

In the compound represented by Formula (1), when z denotes 1, the silane compound represents a trifunctional silane; when z denotes 2, the silane compound represents a difunctional silane; when z denotes 3, the silane compound represents a monofunctional silane.

In one preferred embodiment of the invention, the silane compound having a carboxylic acid anhydride substituent represented by Formula (1) includes but is not limited to (i) trifunctional silane: 2-trimethoxysilylethyl succinic anhydride, 3-triphenoxysilylpropyl succinic anhydride, commercially available 3-(trimethoxysilyl)propyl succinic anhydride manufactured by Shin-Etsu (trade name: X-12-967), commercially available 3-(triethoxysilyl)propyl succinic anhydride manufactured by WACKER (trade name: GF-20), 3-trimethoxysilylpropyl glutaric anhydride (TMSG), 3-triethoxysilylpropyl glutaric anhydride, and 3-triphenoxysilylpropyl glutaric anhydride; (ii) difunctional silane: di-n-butoxysilyl dipropylsuccinic anhydride and dimethoxysilyl diethylsuccinic anhydride; (iii) monofunctional silane: phenoxysilyl tripropylsuccinic anhydride, methylmethoxysilyl diethylsuccinic anhydride. The aforesaid examples of the silane compound can be used alone or as a mixture of two or more.

In one another preferred embodiment of the invention, the silane compound includes but is not limited to a structure represented by Formula (2);

$$Si(R^i)_y(OR^j)_{4-y} \qquad \text{Formula (2)}$$

wherein:
$R^i$ is independently selected from the group consisting of a hydrogen atom, a $C_1$-$C_{10}$ alkyl group, a $C_2$-$C_{10}$ alkenyl group, and a $C_6$-$C_{15}$ aryl group. The $C_1$-$C_{10}$ alkyl group is without a carboxylic acid anhydride. The plural $R^i$s can be identical with or different from each other.

$R^j$ is independently selected from the group consisting of a hydrogen atom, a $C_1$-$C_6$ alkyl group, a $C_1$-$C_6$ acyl group, and a $C_6$-$C_{15}$ aryl group. The plural $R^j$'s can be identical with or different from each other.

y represents an integer from 0 to 3.

The silane compound without a carboxylic acid anhydride substituent represented by Formula (2) includes but is not limited to (i) tetrafunctional silane: tetramethoxysilane, tetraethoxysilane, tetraacetoxysilane, and tetraphenoxy silane; (ii) trifunctional silane: methyltrimethoxysilane (MTMS), methyltriethoxysilane, methyltriisopropoxysilane, methyltrin-butoxysilane, ethyltrimethoxysilane, ethyltriethoxysilane, ethyltriisopropoxysilane, ethyltri-n-butoxysilane, n-propyltrimethoxysilane, n-propyltriethoxysilane, n-butyltrimethoxysilane, n-butyltriethoxysilane, n-hexyltrimethoxysilane, n-hexyltriethoxysilane, decyltrimethoxysilane, vinyltrimethoxysilane, vinyltriethoxysilane, 3-acryloyloxypropyltrimethoxysilane, 3-acryloyloxypropyltriethoxysilane, 3-methylacryloyloxypropyltrimethoxysilane, 3-methylacryloyloxypropyltriethoxysilane, phenyltrimethoxysilane (PTMS), phenyltriethoxysilane (PTES), p-hydroxyphenyltrimethoxysilane, 1-(p-hydroxyphenyl)ethyltrimethoxysilane, 2-(p-hydroxyphenyl)ethyltrimethoxysilane, 4-hydroxy-5-(p-hydroxyphenylcarbonyloxy)pentyltrimethoxysilane, trifluoromethyltrimethoxysilane, trifluoromethyltriethoxysilane, 3,3,3-trifluoropropyltrimethoxysilane, 3-aminopropyltrimethoxysilane, 3-aminopropyltriethoxysilane, 3-glycidoxypropyltrimethoxysilane, 3-glycidoxypropyltriethoxysilane, 2-(3,4-epoxycyclohexyl)ethyltrimethoxysilane, 3-mercaptopropyltrimethoxysilane, 2-oxetanylbutoxypropyltriphenoxysilane, commercially available 2-oxetanylbutoxypropyltrimethoxysilane manufactured by Toagosei (trade name: TMSOX), and commercially available 2-oxetanylbutoxypropyltriethoxysilane manufactured by Toagosei (trade name: TESOX); (iii) difunctional silane: dimethyldimethoxysilane (DMDMS), dimethyldiethoxysilane, dimethyldiacetyloxysilane, di-n-butyldimethoxysilane, diphenyldimethoxysilane, diisopropoxy-di(2-oxetanylbutoxypropyl)silane (DIDOS), and di(3-oxetanylpentyl)dimethoxysilane; and (iv) monofunctional silane: trimethylmethoxysilane, tri-n-butylethoxysilane, 3-glycidoxy dimethylmethoxysilane, 3-glycidoxydimethylethoxysilane, di(2-oxetanylbutoxypentyl)-2-oxetanylpentylethoxysilane, and tri(2-oxetanylpentyl)methoxysilane. The aforesaid examples of the silane compound can be used alone or as a mixture of two or more.

In one embodiment of the invention, when copolymerizing the compound represented by Formula (1), the ring of carboxylic acid anhydride breaks automatically and the compound contains a hydrophilic carboxylic acid group. The polysiloxane (B) obtained thereby has a better sensitivity to a basic development solution. The temperature of the copolymerization is what the ring of carboxylic acid anhydride breaks completely; preferably, the copolymerization is carried out at a temperature higher than 100° C. for 30 minutes.

In one another preferred embodiment of the invention, the siloxane prepolymer includes but is not limited to a structure represented by Formula (3);

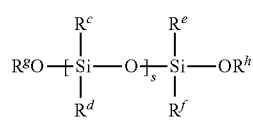

Formula (3)

wherein:
R$^c$, R$^d$, R$^e$, and R$^f$ represent, respectively and independently, a hydrogen atom, a C$_1$-C$_{10}$ alkyl group, a C$_2$-C$_6$ alkenyl group, or a C$_6$-C$_{15}$ aryl group; wherein the alkyl group, alkenyl group or aryl group preferably contains a substituent;
s represents an integer ranging from 1 to 1,000; preferably from 3 to 300; and more preferably from 5 to 200.

When s represents an integer from 2 to 1,000, the plural R$^c$s and R$^d$s can be respectively identical with or different from each other. Examples of the alkyl group include, but are not limited to, methyl, ethyl, n-propyl, or the like. Examples of the alkenyl group include, but are not limited to, vinyl, acryloxypropyl, methacryloxypropyl, or the like. Examples of the aryl group include, but are not limited to, phenyl, tolyl, naphthyl, or the like.

R$^g$ and R$^h$ represent, respectively and independently, a hydrogen atom, a C$_1$-C$_6$ alkyl group, a C$_1$-C$_6$ acyl group, or a C$_6$-C$_{15}$ aryl group; wherein the alkyl group, acyl group or aryl group preferably contains a substituent. Examples of the alkyl group include, but are not limited to, methyl, ethyl, n-propyl, isopropyl, n-butyl, or the like. Examples of the acyl group include, but are not limited to, acetyl, or the like. Examples of the aryl group include, but are not limited to, phenyl, or the like.

Examples of the siloxane prepolymer include, but are not limited to, 1,1,3,3-tetramethyl-1,3-dimethoxydisiloxane, 1,1,3,3-tetramethyl-1,3-diethoxydisiloxane, 1,1,3,3-tetraethyl-1,3-diethoxydisiloxane, commercially available silanol terminal siloxane prepolymers manufactured by Gelest Inc. for example, DM-S12 (molecular weight: 400-700), DMS-S15 (molecular weight: 1,500-2,000), DMS-S21 (molecular weight: 4,200), DMS-S27 (molecular weight: 18,000), DMS-S31 (molecular weight: 26,000), DMS-S32 (molecular weight: 36,000), DMS-S33 (molecular weight: 43,500), DMS-S35 (molecular weight: 49,000), DMS-S38 (molecular weight: 58,000), DMS-S42 (molecular weight: 77,000), PDS-9931 (molecular weight: 1,000-1,400), or the like. The aforesaid examples of the siloxane prepolymer can be used alone or as a mixture of two or more.

When the silane compound and the siloxane prepolymer are used in combination, there is no specific limitation to the mixing ratio thereof. Preferably, the molar ratio of the silane compound and the siloxane prepolymer in Si atom ranges from 100:0.01 to 50:50.

In one another preferred embodiment of the invention, besides of obtained by hydrolyzing and condensing a silane compound and/or a siloxane prepolymer, the polysiloxane can also be prepared via a copolymerization by mixing the silane compound and/or siloxane prepolymer with silicon dioxide particles. There is no specific limitation to the mean particle size of the silicon dioxide particles. The mean particle size of the silicon dioxide particles ranges generally from 2 nm to 250 nm, preferably from 5 nm to 200 nm, and more preferably from 10 nm to 100 nm.

Examples of the silicon dioxide particles include commercially available products manufactured by Catalysts and Chemicals Ltd., for example, OSCAR 1132 (particle size: 12 nm, dispersant: methanol), OSCAR 1332 (particle size: 12 nm, dispersant: n-propanol), OSCAR 105 (particle size: 60 nm, dispersant: γ-butyrolactone), OSCAR 106 (particle size: 120 nm, dispersant: diacetone alcohol), or the like; commercially available products manufactured by Fuso Chemical Co., Ltd., for example, Quartron PL-1-IPA (particle size: 13 nm, dispersant: isopropanone), Quartron PL-1-TOL (particle size: 13 nm, dispersant: toluene), Quartron PL-2L-PGME (particle size: 18 nm, dispersant: propylene glycol monomethyl ether), Quartron PL-2L-MEK (particle size: 18 nm, dispersant: methyl ethyl ketone), or the like; commercially available products manufactured Nissan Chemical, for example, IPA-ST (particle size: 12 nm, dispersant: isopropanol), EG-ST (particle size: 12 nm, dispersant: ethylene glycol), IPA-ST-L (particle size: 45 nm, dispersant: isopropanol), IPA-ST-ZL (particle size: 100 nm, dispersant: isopropanol), or the like. The aforesaid silicon dioxide particles can be used alone or as a mixture of two or more.

There is no specific limitation to the amounts when mixing the silicon dioxide particles with the silane compound and/or the siloxane prepolymer. Preferably, the molar ratio of the silicon dioxide particles to the polysiloxane (B) in Si atom ranges from 1% to 50%.

The synthesis of the polysiloxane (B) according to the invention includes but is not limited to hydrolyzing and condensing a silane compound and/or a siloxane prepolymer, and silicon dioxide particles; preferably hydrolyzing and condensing the silane compound represented by Formula (1) or (2). Preferably, a solvent, such as water, and optionally a catalyst are added to the reaction mixture, followed by stirring at a high temperature. During stirring, the by-products of hydrolysis such as alcohols (e.g. methanol) and the by-products of condensation such as water, can be removed by distillation if necessary.

There is no specific limitation to the solvent of synthesizing the polysiloxane (B), which can be identical with the organic solvent (D) as mentioned below. The solvent is used in an amount ranging generally from 10 wt % to 1000 wt %, preferably 100 wt %, based on 100 wt % of the total organic silane. When water is applied as the solvent, the amount of water for the hydrolysis ranges from 0.5 to 2 moles based on 1 mole of the hydrolyzable groups contained in the mixture.

There is no specific limitation to the catalyst optionally added in the synthesis of the polysiloxane (B), and an acid catalyst or a base catalyst can be preferably used. Examples of the acid catalyst include hydrochloric acid, nitric acid, sulfuric acid, hydrofluoric acid, oxalic acid, phosphoric acid, acetic acid, trifluoroacetic acid, formic acid, polycarboxylic acids and anhydrides thereof. Examples of the base catalyst include diethylamine, triethylamine, tripropylamine, tributylamine, tripentylamine, trihexylamine, triheptylamine, trioctylamine, diethanolamine, triethanolamine, sodium hydroxide, potassium hydroxide hydrate, and compounds containing an amino group. Preferably, the catalyst is used in an amount ranging generally from 0.01 wt % to 1 wt %, based on 100 wt % of the total organic silane.

In view of the coatability and storage stability, it is preferable that the by-products (for example, alcohols or water) and the catalyst are not contained in polysiloxane (B) produced after hydrolysis and condensation. Therefore, purification is carried out if necessary. There is no specific limitation to the purification method. Preferably, the polysiloxane (B) is diluted with a hydrophobic solvent, and the organic layer washed with water several times is then concentrated with an evaporator to remove alcohols and water. Additionally, the catalyst can be removed using ion exchange resin or using the wash with water as mentioned above.

According to the invention, the amount of the polysiloxane (B) used can be adjusted as needed. In one embodiment of the invention, the amount of the polysiloxane (B) used is preferably from 1 to 50 parts by weight based on 100 parts by weight of the alkali-soluble resin (A) used; more preferably from 3 to 48 parts by weight; still more preferably from 5 to 45 parts by weight.

This invention is not limited by theory, but it is believed that because the heat resistance of the polysiloxane is better than that of acrylic resins, the heat resistance of the photoresist composition is improved by adding the polysiloxane. Furthermore, the yellowing caused by high temperature pyrolysis of the components in the composition is avoided. If the polysiloxane according to the invention is absent, the thermal transmittance and the chemical resistance is not good.

In another aspect, the development is improved by using the polysiloxane (B) with a carboxylic acid anhydride modification.

The compound having an ethylenically unsaturated group (C) according to the present invention is a compound having at least one ethylenically unsaturated group. Examples of the compound having an ethylenically unsaturated group include, but are not limited to, acrylamide, (meth)acryloylmorpholine, 7-amino-3,7-dimethyloctyl (meth)acrylate, iso-butoxymethyl (meth)acrylamide, iso-bornyloxyethyl (meth)acrylate, iso-bornyl (meth)acrylate, 2-ethylhexyl (meth)acrylate, ethyl diethylene glycol (meth)acrylate, t-octyl (meth)acrylamide, diacetone (meth)acrylamide, dimethylaminoethyl (meth)acrylate, dodecyl (meth)acrylate, dicyclopentenyloxyethyl (meth)acrylate, dicyclopentenyl (meth)acrylate, N,N-dimethyl (meth)acrylamide, tetrachlorophenyl (meth)acrylate, 2-tetrachlorophenoxy ethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, 2-hydroxyethyl (meth)acrylate, 2-hydroxypropyl (meth)acrylate, vinylcaprolactam, N-vinylpyrrolidone, phenoxyethyl (meth)acrylate, pentachlorophenyl (meth)acrylate, pentabromophenyl (meth)acrylate, polyethylene glycol mono(meth)acrylate, polypropylene glycol mono(meth)acrylate, bornyl (meth)acrylate, diethylene glycol mono ethyl ether (meth)acrylate, 3-methoxy butyl (meth)acrylate, 2-(meth)acryloyl oxy ethyl-2-hydroxypropyl phthalate, omega-carboxy polycaprolactone monoacrylate, ARONIX M-101, M-111, M-114, M-5300 (manufactured by Toagosei®), KAYARAD TC-110S, TC-120S (manufactured by Nippon Kayaku®), Viscoat 158, 2311 (manufactured by Osaka Organic Chemical Industry Ltd.), or like.

Examples of the compound having two or more than two ethylenically unsaturated groups include, but are not limited to, diethylene glycol di(meth)acrylate, dicyclopentenyl di(meth)acrylate, triethylene glycol diacrylate, tetraethylene glycol di(meth)acrylate, tri(2-hydroxyethyl)isocyanate di(meth)acrylate, tri(2-hydroxyethyl)isocyanate tri(meth)acrylate, caprolactone-modified tri(2-hydroxyethyl)isocyanate tri(meth)acrylate, trimethylolpropyl tri(meth)acrylate, ethylene oxide (hereinafter abbreviated as EO) modified trimethylolpropyl tri(meth)acrylate, propylene oxide (hereinafter abbreviated as PO) modified trimethylolpropyl tri(meth)acrylate, tripropylene glycol di(meth)acrylate, neo-pentyl glycol di(meth)acrylate, 1,4-butanediol di(meth)acrylate, 1,6-hexanediol di(meth)acrylate, 1,9-nonamethylene glycol di(meth)acrylate, bis(ethanolyl phenoxy)fluorene di(meth)acrylate, pentaerythritol tri(meth)acrylate, pentaerythritol tetra(meth)acrylate, polyester di(meth)acrylate, polyethylene glycol di(meth)acrylate, dipentaerythritol hexa(meth)acrylate, dipentaerythritol penta(meth)acrylate, dipentaerythritol tetra(meth)acrylate, caprolactone-modified dipentaerythritol hexa(meth)acrylate, caprolactone-modified dipentaerythritol penta(meth)acrylate, ditrimethylolpropyl tetra(meth)acrylate, EO-modified bisphenol A di(meth)acrylate, PO-modified bisphenol A di(meth)acrylate, EO-modified hydrogenated bisphenol A di(meth)acrylate, PO-modified hydrogenated bisphenol A di(meth)acrylate, PO-modified glycerol triacrylate, EO-modified bisphenol F di(meth)acrylate, phenol novolac polyglycidyl ether (meth)acrylate, tri(2-(meth)acryloyloxyethyl)phosphorylcholine ARONIX M-210, M-240, M-6200, M-309, M-400, M-405, M-450, M-7100, M-8030, M-8060; TO-1450 (manufactured by Toagosei®), KAYARAD HDDA, HX-220, R-604, DPHA, TMPTA, DPCA-20, DPCA-30, DPCA-60, DPCA-120 (manufactured by Nippon Kayaku®), Viscoat 260, 312, 335H.P., 295, 300, 360, GPT, 3PA, 400 (manufactured by Osaka Organic Chemical Industry Ltd.), or the like.

Examples of the compound having nine or more than nine ethylenically unsaturated groups include, but are not limited to a compound having an ethylene linear and alicyclic structure. For example, the compound is a polyurethane acrylate obtained by reacting a compound having more than two isocyanato groups and a (meth)acrylate compound having one or more hydroxyl groups and having three, four or five functional groups within one molecule. Examples of the compound are New frontier R-1150 (manufactured by Dai-ichi Kogyo Seiyaku Co. Ltd.) and KAYARAD DPHA-40H (manufactured by Nippon Kayaku®).

Preferably, the compound having an ethylenic group is selected from trimethylolpropyl triacrylate, EO-modified trimethylolpropyl triacrylate, PO-modified trimethylolpropyl triacrylate, pentaerythritol triacrylate, pentaerythritol tetracrylate, dipentaerythritol hexaacrylate, dipentaerythritol pentaacrylate, dipentaerythritol tetraacrylate, caprolactone-modified dipentaerythritol hexaacrylate, ditrimethylolpropyl tetraacrylate, and PO-modified glycerol triacrylate. The aforesaid examples of the compound having an ethylenic group can be used alone or in admixture of two or more thereof.

There is no specific limitation to the amount of the compound having an ethylenically unsaturated group (C) according to the invention used. Artisans skilled in the field can adjust the amount as needed. In one embodiment of the invention, the amount of the compound having an ethylenically unsaturated group (C) used is from 5 to 220 parts by weight based on 100 parts by weight of the alkali-soluble resin (A) used; more preferably, the amount of the compound having an ethylenically unsaturated group (C) used is from 10 to 200 parts by weight; still more preferably, the amount of the compound having an ethylenically unsaturated group (C) used is from 15 to 180 parts by weight.

There is no specific limitation to the photoinitiator (D). In one embodiment of the invention, the photoinitiator (C) includes O-acyloxime compounds, triazine compounds, acetophenone compounds, biimidazole compounds, or benzophenone compounds, α-diketone compounds, acyloin compounds, acyloin ether compounds, acylphosphine oxide compounds, quinone compounds, halide compounds, and peroxide compounds.

Examples of the O-acyloxime compounds include, but are not limited to, 1-[4-(phenylthio)phenyl]-heptane-1,2-dione 2-(O-benzoyloxime), 1-[4-(phenylthio)phenyl]-octane-1,2-dione 2-(O-benzoyloxime), 1-[4-(benzoyl)phenyl]-heptane-1,2-dione 2-(O-benzoyloxime), 1-[9-ethyl-6-(2-methylbenzoyl)-9H-carbazol-3-yl]-ethylketo 1-(O-acetyloxime), 1-[9-ethyl-6-(3-methylbenzoyl)-9H-carbazol-3-yl]ethylketo 1-(O-acetyloxime), 1-[9-ethyl-6-benzoyl-9H-carbazol-3-yl]-ethylketo 1-(O-acetyloxime), ethylketo-1-[9-ethyl-6-(2-methyl-4-tetrahydrofurylbenzoyl)-9H-carbazl-3-yl]-1-(O-acetyloxime), ethylketo-1-[9-ethyl-6-(2-methyl-4-tetrapyranylbenzoyl)-9H-carbazol-3-yl]-1-(O-acetyloxime), ethylketo-1-[9-ethyl-6-(2-methyl-5-tetrafurylbenzoyl)-9H-carbazol-3-yl]-1-(O-acetyloxime), ethylketo-1-[9-ethyl-6-(2-methyl-5-tetrapyranylbenzoyl)-9H-carbazol-3-yl]-1-(O-acetyloxime), ethylketo-1-[9-ethyl-6-(2-methyl-4-tetrafurylmethoxybenzoyl)-9H-carbazol-3-yl]-1-(O-acetyloxime), ethylketo-1-[9-ethyl-6-(2-methyl-4-tetrapyranylmethoxybenzoyl)-9H-carbazol-3-yl]-1-(O-acetyloxime), ethylketo-1-[9-ethyl-6-(2-methyl-5-tetrafurylmethoxybenzoyl)-9H-carbazol-3-yl]-1-(O-acetyloxime), ethylketo-1-[9-ethyl-6-(2-methyl-5-tetrapyranylmethoxybenzoyl)-9H-carbazol-3-yl]-1-(O-acetyloxime), ethylketo-1-[9-ethyl-6-{2-methyl-4-(2,2-dimethyl-1,3-dioxolyl)benzoyl}-9H-carbazol-3-yl]-1-(O-acetyloxime), ethylketo-1-[9-ethyl-6-{2-methyl-4-(2,2-dimethyl-1,3-dioxolyl)methoxybenzoyl}-9H-carbazol-3-yl]-1-(O-acetyloxime), or the like.

The aforesaid examples of the O-acyloxime compounds can be used alone or in admixture of two or more thereof. Preferably, the O-acyloxime compounds are 1-[4-(phenylthio)phenyl]-octane-1,2-dione 2-(O-benzoyloxime), 1-[9-ethyl-6-(2-methylbenzoyl)-9H-carbazol-3-yl]-ethylketo 1-(O-acetyloxime), ethylketo-1-[9-ethyl-6-(2-methyl-4-tetrapyranylmethoxybenzoyl)-9H-carbazol-3-yl]-1-(O-acetyloxime), ethylketo-1-[9-ethyl-6-{2-methyl-4-(2,2-dimethyl-1,3-dioxolyl)methoxybenzoyl}-9H-carbazol-3-yl]-1-(O-acetyloxime), or the like.

Examples of the triazine compounds are vinyl-halomethyl-s-triazine compounds, 2-(naphth-1-yl)-4,6-bis-halomethyl-s-triazine compounds and 4-(p-aminophenyl)-2,6-di-halomethyl-s-triazine compounds, or the like.

Examples of the vinyl-halomethyl-s-triazine compounds are 2,4-bis(trichloromethyl)-6-(p-methoxy)styryl-s-triazine, 2,4-bis(trichloromethyl)-3-(1-p-dimethylaminophenyl-1,3-butadienyl)-s-triazine, 2-trichloromethyl-3-amino-6-(p-methoxy)styryl-s-triazine, or the like.

Examples of the 2-(naphth-1-yl)-4,6-bis-halomethyl-s-triazine compounds are 2-(naphtha-1-yl)-4,6-bis-trichloromethyl-s-triazine, 2-(4-methoxy-naphtho-1-yl)-4,6-bis-trichloromethyl-s-triazine, 2-(4-ethoxy-naphtho-1-yl)-4,6-bis-trichloromethyl-s-triazine, 2-(4-butoxy-naphtho-1-yl)-4,6-bis-trichloromethyl-s-triazine, 2-(4-(2-methoxyethyl-naphtho-1-yl)-4,6-bis-trichloromethyl-s-triazine, 2-(4-(2-ethoxyethyl-naphtho-1-yl)-4,6-bis-trichloromethyl-s-triazine, 2-(4-(2-butoxyethyl-naphtho-1-yl)-4,6-bis-trichloromethyl-s-triazine, 2-(2-methoxy-naphtho-1-yl)-4,6-bis-trichloromethyl-s-triazine, 2-(6-methoxy-5-methyl-naphtho-2-yl)-4,6-bis-trichloromethyl-s-triazine, 2-(6-methoxy-naphtho-2-yl)-4,6-bis-trichloromethyl-s-triazine, 2-(5-methoxy-naphtho-1-yl)-4,6-bis-trichloromethyl-s-triazine, 2-(4,7-dimethoxy-naphtho-1-yl)-4,6-bis-trichloromethyl-s-triazine, 2-(6-ethoxy-naphtho-2-yl)-4,6-bis-trichloromethyl-s-triazine, 2-(4,5-dimethoxy-naphtho-1-yl)-4,6-bis-trichloromethyl-s-triazine or the like.

Examples of the 4-(p-aminophenyl)-2,6-di-halomethyl-s-triazine compounds are 4-[p-N,N-di(ethoxycarbonylmethyl)aminophenyl]-2,6-di(trichloromethyl)-s-t-riazine, 4-[o-methyl-p-N,N-di(ethoxycarbonylmethyl)aminophenyl]-2,6-di(tri-chloromethyl)-s-triazine, 4-[p-N,N-di(chloroethyl)aminophenyl]-2,6-di(trichloromethyl)-s-triazine, 4-[o-methyl-p-N,N-di(chloroethyl)aminophenyl]-2,6-di(trichloromethyl)-s-triazine, 4-[p-N-chloroethylaminophenyl]-2,6-di(trichloromethyl)-s-triazine, 4-[p-N-ethoxycarbonylmethylaminophenyl]-2,6-di(trichloromethyl)-s-triazine, 4-[p-N,N-di(phenypaminophenyl)-2,6-di(trichloromethyl)-s-triazine, 4-[p-N-chloroethylcarbonylaminophenyl]-2,6-di(trichloromethyl)-s-triazine, 4-[p-N-(p-methoxyphenyl)carbonylaminophenyl]-2,6-di(trichloromethyl)-s-triazine, 4-[m-N,N-di(ethoxycarbonylmethyl)aminophenyl]-2,6-di(trichloromethyl)-s-triazine, 4-[m-bromo-p-N,N-di(ethoxycarbonylmethyl)aminophenyl]-2,6-di(trichloromethyl)-s-triazine, 4-[m-chloro-p-N,N-di(ethoxycarbonylmethyl)aminophenyl]-2,6-di(trichloromethyl)-s-triazine, 4-[m-fluoro-p-N,N-di(ethoxycarbonylmethyl)aminophenyl]-2,6-di(trichloromethyl)-s-triazine, 4-[o-bromo-p-N,N-di(ethoxycarbonylmethyl)aminophenyl]-2,6-di(trichloromethyl)-s-triazine, 4-[o-chloro-p-N,N-di(ethoxycarbonylmethyl)aminophenyl]-2,6-di(trichloromethyl)-s-triazine, 4-[m-fluoro-p-N,N-di(ethoxycarbonylmethyl)aminophenyl]-2,6-di(trichloromethyl)-s-triazine, 4-[o-bromo-p-N,N-di(chloroethyl)aminophenyl]-2,6-di(trichloromethyl)-s- triazine, 4-[o-chloro-p-N,N-di(chloroethyl)aminophenyl]-2,6-di(trichloromethyl)-s-triazine, 4-[o-fluoro-p-N,N-di(chloroethyl)aminophenyl]-2,6-di(trichloromethyl)-s-triazine, 4-[m-bromo-p-N,N-di(chloroethyl)aminophenyl]-2,6-di(trichloromethyl)-s-triazine, 4-[m-chloro-p-N,N-di(chloroethyl)aminophenyl]-2,6-di(trichloromethyl)-s-triazine, 4-[m-fluoro-p-N,N-di(chloroethyl)aminophenyl]-2,6-di(trichloromethyl)-s-triazine, 4-(m-bromo-p-N-ethoxycarb onylmethylaminophenyl)-2,6-di(trichloromethyl)-s-triazine, 4-(m-chloro-p-N-ethoxycarbonylmethylaminophenyl)-2,6-di(trichloromethyl)-s-triazine, 4-(m-fluoro-p-N-ethoxycarbonylmethylaminophenyl)-2,6-di(trichloromethyl)-s-triazine, 4-(o-bromo-p-N-ethoxycarbonylmethylaminophenyl)-2,6-di(trichloromethyl)-s-triazine, 4-(o-chloro-p-N-ethoxycarbonylmethylaminophenyl)-2,6-di(trichloromethyl)-s-triazine, 4-(m-fluoro-p-N-ethoxycarbonylmethylaminophenyl)-2,6-di(trichloromethyl)-s-triazine, 4-(m-bromo-p-N-chloroethylaminophenyl)-2,6-di(trichloromethyl)-s-triazine, 4-(m-chloro-p-N-chloroethylaminophenyl)-2,6-di(trichloromethyl)-s-triazine, 4-(m-fluoro-p-N-chloroethylaminophenyl)-2,6-di(trichloromethyl)-s-triazine, 4-(o-bromo-p-N-chloroethylaminophenyl)-2,6-di(trichloromethyl)-s-triazine, 4-(o-chloro-p-N-chloroethylaminophenyl)-2,6-di(trichloromethyl)-s-triazine, 4-(o-fluoro-p-N-chloroethylaminophenyl)-2,6-di(trichloromethyl)-s-triazine, 2,4-bis(trichloromethyl)-6-[3-bromo-4-[N,N-di(ethoxycarbonylmethyl)amino]-phenyl]-1,3,5-triazine, or the like.

The aforesaid examples of the triazine compounds can be used alone or in admixture of two or more thereof. Preferably, the triazine compounds are 4-[m-bromo-p-N,N-di(ethoxycarbonylmethyl)aminophenyl]-2,6-di(trichloromet-hyl)-s-triazine, and 2,4-bis(trichloromethyl)-6-(p-methoxy)styryl-s-triazine.

Examples of the acetophenone compounds are p-dimethylamino-acetophenone, α,α'-dimethoxyazoxyacetophenone, 2,2'-dimethyl-2-phenylacetophenone, p-methoxyacetophenone, 2-methyl-1-[4-(methylthio)phenyl]-2-morpholino-1-propanone, and 2-benzyl-2-N,N-dimethylamino-1-(4-morpholinophenyl)-1-butanone. The aforesaid examples of the acetophenone compounds can be used alone or in admixture of two or more thereof. Preferably, the acetophenone compounds are 2-methyl-1-[4-(methylthio)phenyl]-2-morpholino-1-propanone, and 2-benzyl-2-N,N-dimethylamino-1-(4-morpholinophenyl)-1-butanone.

Examples of the biimidazole compounds are as follows: 2,2'-bis(o-chlorophenyl)-4,4',5,5'-tetraphenyl-biimidazole, 2,2'-bis(o-fluorophenyl)-4,4',5,5'-tetraphenyl biimidazole, 2,2'-bis(o-methyl phenyl)-4,4',5,5'-tetraphenyl biimidazole, 2,2'-bis(o-methoxyphenyl)-4,4',5,5'-tetraphenyl biimidazole, 2,2'-bis(o-ethylphenyl)-4,4',5,5'-tetraphenyl biimidazole, 2,2'-bis(p-methoxyphenyl)-4,4',5,5'-tetraphenyl biimidazole, 2,2'-bis(2',4,4'-tetramethoxyphenyl)-4,4',5,5'-tetraphenyl biimidazole, 2,2'-bis(2-chlorophenyl)-4,4',5,5'-tetraphenyl biimidazole, and 2,2'-bis(2,4-dichlorophenyl)-4,4',5,5'-tetraphenyl biimidazole. The aforesaid examples of the biimidazole compounds can be used alone or in admixture of two or more thereof. Preferably, the biimidazole compounds are 2,2'-bis(2,4-dichlorophenyl)-4,4',5,5'-tetraphenyl biimidazole.

Examples of the benzophenone compounds includethioxanthone, 2,4-diethylthioxanthone, thioxanthone-4-sulfone, benzophenone, 4,4'-bis(dimethylamino)benzophenone, 4,4'-bis(diethylamino)benzophenone, or the like. The aforesaid examples of the benzophenone compounds can be used alone or in admixture of two or more thereof. Preferably, the benzophenone compounds are 4,4'-bis(diethylamino)benzophenone.

Examples of the α-diketone compounds include: benzil, and acetyl. Examples of ketone alcohol compounds include: benzoin. Examples of acyloin ether type compounds include: benzoin methylether, benzoin ethylether, and benzoin isopropyl ether. Examples of acyl phosphine oxide compounds include: 2,4,6-trimethyl-benzoyl diphenylphosphineoxide, and bis-(2,6-dimethoxy-benzoyl)-2,4,4-trimethylbenzyl phosphineoxide. Examples of quinone compounds include: anthraquinone, and 1,4-naphthoquinone. Examples of compounds containing halogens include: phenacyl chloride, tribromomethyl phenylsulfone, and tris(trichloromethyl)-s-triazine Examples of peroxides include: di-tertbutylperoxide. The aforesaid examples can be used alone or in admixture of two or more thereof.

The amount of the photoinitiator (D) according to the invention used can be adjusted as needed. In one embodiment of the invention, the amount of the photoinitiator (D) used is from 1 to 60 parts by weight based on 100 parts by weight of the compound having an ethylenically unsaturated group (C); preferably, the amount used is from 3 to 55 parts by weight; still more preferably, the amount used is from 5 to 50 parts by weight.

The composition according to the invention preferably further comprises a solvent. The solvent (D) according to the invention is able to dissolve other organic components completely and the volatility must be high enough to enable the solvent to be evaporated from the dispersion with a small amount of heat at atmospheric pressure. The solvents with a boiling point below than 150° C. at atmospheric pressure are used most usually. Such solvents are aromatic solvents such as benzene, toluene, and xylene; alcohol solvents, such as methanol and ethanol; ether solvents, such as ethylene glycol monopropyl ether, diethylene glycol dimethyl ether, tetrahydrofuran, ethylene glycol monomethyl ether, ethylene glycol monoethyl ether, diethylene glycol monomethyl ether, diethylene glycol diethyl ether, diethylene glycol monobutyl ether; esters solvents, such as ethylene glycol methyl ether acetate, ethylene glycol ethyl ether acetate, propylene glycol methyl ether acetate, propylene glycol ether acetate, propylene glycol propyl ether acetate, ethyl 3-ethoxypropionate; ketone solvent, such as methyl ethyl ketone and acetone. Preferably, diethylene glycol dimethyl ether, propylene glycol methyl ether acetate and ethyl 3-ethoxypropionate are used alone or in admixture of the two and the storage stability of the photosensitive resin composition is the best.

Preferably, the photosensitive resin composition according to the present invention can contain other additives according to the specific requirements for the physical and/or chemical properties. The additives can be chosen by skilled artisans in the field. Examples of the additives are fillers, polymers other than the alkali-soluble resin (A), UV absorbents, anti-coagulants, surfactants, adhesion improving agents, storage stabilizers, and heat resistance improving agents.

In one preferred embodiment of the invention, the fillers are glass, aluminum fillers; the polymers other than the alkali-soluble resin (A) are polyvinyl alcohol, polyglycol monoether, and polyacrylate fluoride.

The UV absorbents are 2-(3-t-butyl-5-methyl-2-hydroxyphenyl)-5-chlorobenzotriazole, or alkoxybenzophenone; and the anti-coagulants include sodium polyacrylate.

The surfactants can improve the coating of the composition according to the invention. In one embodiment of the invention, the surfactants include a fluorine-based surfactants or silicone-based surfactants.

Specific examples of the fluorine-based surfactants include fluorine-based surfactants formed of compounds respectively having a fluoroalkyl or fluoroalkylene group at least at any of the ends. In one embodiment of the invention, the fluorine-based surfactants include 1,1,2,2-tetrafluorooctyl(1,1,2,2-tetrafluoropropyl)ether, 1,1,2,2-tetrafluorooctylhexyl ether, octaethylene glycol di(1,1,2,2-tetrafluorobutyl)ether, hexaethylene glycol (1,1,2,2,3,3-hexafluoropentyl)ether, octapropylene glycol di(1,1,2,2-tetrafluorobutyl)ether, hexapropylene glycol di(1,1,2,2,3,3-hexafluoropentyl)ether, sodium perfluorododecylsulfonate, 1,1,2,2,8,8,9,9,10,10-decafluorododecane, 1,1,2,2,3,3-hexafluorodecane, sodium fluoroalkylbenzene sulfonate, sodium fluoroalkyl phosphate, sodium fluoroalkyl carboxylate, fluoroalkyl polyoxyethylene ether, diglycerin tetra(fluoroalkyl polyoxyethylene ethers), fluoroalkyl ammonium iodide, fluoroalkyl betaine, fluoroalkyl polyoxyethylene ethers, perfluoroalkyl polyoxyethylene ether, and perfluoroalkyl alkanol. In one another embodiment of the invention, the fluorine-based surfactants include BM-1000, BM-1100 (manufactured by BM CHEMIE), Megafac® F142D, F172, F173, F183, F178, F191, F471 and F476 (manufactured by Dainippon Ink and Chemical Industries, Ltd.), Fluorad® FC-170C, FC-171, FC-430, FC-431 (manufactured by Sumitomo chemical), chlorofluorocarbons S-112, S-113, S-131, S-141, S-145, S-382, SC-101, SC-102, SC-103, SC-104, SC-105, SC-106 (manufactured by Asahi Glass Company), F TOP EF301, 303, 352 (manufactured by Shin Akita Chemical Co., Ltd), FTERGENT FT-100, FT-110, FT-140A, FT-150, FT-250, FT-251, FTX-251, FTX-218, FT-300, FT-310, FT-400S (manufactured by NEOSU Ltd.)

Examples of the silicone-based surfactants are TORE silicone DC3PA DC7PA, SH11PA, SH21PA, SH28PA, SH29PA, SH30PA, SH-190, SH-193, SZ-6032, SF-8427, SF-8428, DC-57, DC-190 (manufactured by Dow Corning Toray Silicone), TSF-4440, TSF-4300, TSF-4445, TSF-4446, TSF-4460, TSF-4452 (manufactured by GE Toshiba silicone).

In addition to said fluorine-based surfactants or silicone-based surfactants, the surfactant refers to polyoxyethylene alkyl ethers, such as lauryl alcohol polyoxyethylene, polyoxyethylene stearic acid ether and polyoxyethylene oleyl ether; polyoxyethylene aryl ethers, such as polyoxyethylene n-octyl phenyl ether and polyoxyethylene n-nonylphenol ether; polyoxyethylene dialkyl esters, such as polyoxyethylene dilaurate and polyoxyethylene distearate; non-ionic surfactants, such as KP341 (manufactured by Shin-Etsu Chemical), poly Flow No.57, 95 (manufactured by Kyoeisha Yushi Chemical Industries, Ltd.)

The aforesaid examples of surfactants can be used alone or in admixture of two or more thereof.

The adhesion improving agents are able to improve the adhesive force of the substrate, and preferably the adhesion improving agents are functional silane crosslinking agents. Preferably, the functional silane crosslinking agents include a carboxyl, alkenyl, isocyanate, epoxy group, amino, sulfhydryl group or halogen. Examples are as follows: p-hydroxyphenyltrimethoxy silane, 3-methacroxyl propyl trimethoxysilane, vinyl triacetoxylsilane, vinyl trimethoxysilane, vinyl triethoxysilane, vinyl tri(2-methoxylethoxy)silane, γ-isocyanate propyl triethoxysilane, 3-epoxy propoxy propyl trimethoxysilane, 2-(3,4-epoxy cyclohexane) ethyl trimethoxysilane, 3-epoxy propoxy dimethyl methoxysilane, 3-aminopropyl trimethoxysilane, N-(2-aminoethyl)-3-aminopropyl trimethoxysilane, N-(2-aminoethyl)-3-aminopropyl methyl dimethoxysilane, 3-mercaptopropyl trimethoxysilane, 3-chloropropyl trimethoxysilane and 3-chloropropyl methyl dimethoxysilane. Those adhesion improving agents can be used independently or mixedly.

The storage stabilizers can be sulphur, quinone, hydroquinone, poly oxide, amine, nitroso compounds or Nitro compounds. Examples are as follows: 4-methoxyphenol, (N-mitroso-N-phenyl)hydroxylamino aluminum, 2,2-thiobis(4-methyl-6-tert-butylphenol) and 2,6-di-tert-butylphenol.

The heat resistance improving agents can be to N-(alkoxy methyl)glycoluril compounds and N-(alkoxy methyl) melamine Examples of said N-(alkoxy methyl)glycoluril compounds are as follows: N,N,N',N'-tetra(methoxy methyl) glycoluril, N,N,N',N'-tetra(ethyoxylmethyl)glycoluril, N,N,N',N'-tetra(n-propoxy methyl)glycoluril, N,N,N',N'-tetra(isopropoxy methyl)glycoluril, N,N,N',N'-tetra(n-butoxy methyl)glycoluril and N,N,N',N'-tetra(tert-butoxy methyl)glycoluril, and preferably N,N,N',N'-tetra(methoxy methyl) glycoluril. Examples of said N-(alkoxy methyl)melamine are as follows: N,N,N',N',N",N"-hexa(methoxy methyl) melamine, N,N,N',N',N",N"-hexa(ethyoxylmethyl) melamine, N,N,N',N',N",N"-hexa(n-propoxy methyl) melamine, N,N,N',N',N",N"-hexa(isopropoxy methyl) melamine, N,N,N',N',N",N"-hexa(n-butoxy methyl) melamine, and N,N,N',N',N",N"-hexa(tert-butoxy methyl) melamine, and preferably N,N,N',N',N",N"-hexa(methoxy methyl)melamine Commercialized products are such as NIKARAKKU N-2702 and MW-30M (manufactured by SANHE CHEMICALS CO. LTD).

The amount of the additives according to the invention can be chosen by skilled artisans in this field. Preferably, The additives are used in an amount ranging generally from 0 to 10 parts by weight, preferably from 0 to 6 parts by weight, and more preferably from 0 to 3 parts by weight, based on 100 parts by weight of the alkali-soluble resin (A).

The present invention also provides a method for forming a thin film on a substrate comprising applying the photosensitive resin composition as mentioned above on the substrate; preferably, the thin film is an overcoat or a spacer.

The present invention also provides a thin film on a substrate, which is obtained by the method as mentioned above.

In one embodiment of the invention, the method for forming the overcoat comprises at least steps of:
  (a) applying the photosensitive composition according to the invention on a substrate to form a film;
  (b) irradiating at least one part of the film with radiation;
  (c) developing the film after radiating with radiation; and
  (d) heating the film after development.

The steps are illustrated as follows:

Step (a) is applying the photosensitive composition according to the invention on a substrate to form a film. When forming an overcoat, a pixel layer consisting of red, green and blue colored layers is formed on a transparent substrate, and then the photosensitive resin composition according to the present invention is formed on said pixel layer. When forming a spacer, a transparent conductive film is covered on a transparent substrate having an overcoat and pixel layer, and then a film of said photosensitive resin composition is formed on the transparent conductive film.

In one embodiment of the present invention, said transparent substrate refers to glass or resin substrate, and preferably glass substrate such as soda-lime glass and alkali-free glass. Examples of said resin substrate are as follows: plyethylene terephthalate, polybutylene terephthalate, polyether sulfone, polycarbonate and polyimide.

One embodiment of the transparent conductive film contains NESA film (USA PPG®) having stannic oxide ($SnO_2$)

or ITO film having indium oxide-stannic oxide ($In_2O_3$—$SnO_2$), etc on the entire surface.

The manner for forming the film can be coating method or drying film method.

According to the coating method for forming film, the solution of the photosensitive resin composition according to the present invention is coated on said transparent conductive film. Preferably, the coating surface of the film is heated up (pre-baked). The composition solution used in the coating method has a solid content concentration preferably 5 to 50 wt %, more preferably 10 to 40 wt %, and most preferably 15 to 35 wt %. The coating methods include (but not limited to) spraying, roller painting, spin coating, slit die coating, stick coating, inkjet coating, and preferably spin coating or slit die coating method.

On the other hand, the drying film method is conducted in a way that the photosensitive dry film of the photosensitive resin composition according to the present invention (referred to as "photosensitive dry film") is stacked on a base film.

Said photosensitive dry film can be stacked on a dry film to form a photosensitive film after removing solvent. The photosensitive resin composition applied in the drying film method has a solid content concentration preferably about 5 to 50 wt %, more preferably 10 to 50 wt % and 20 to 50 wt %, most preferably 30 to 50 wt %. Examples of the base film of the photosensitive dry film are as follows: polyethylene terephthalate (PET), polyethylene, polypropylene, polycarbonate and polyvinyl chloride. The thickness of the base film of the photosensitive dry film is preferably 15 to 125 μm and more preferably 1 to 30 μm.

When not in use, the photosensitive dry film can also be stacked and stored by a coating film. The coating film according to the present invention preferably has de-bonding property to make it not to be separated when not in use and make it easy to be separated when in use. Examples of the coating film having said property are organic silicon release agent sprayed or printed onto a synthetic resin film, such as PET film, polypropylene film, polyethylene film, polyvinyl chloride film and polyurethane film. The thickness of such coating film is preferably about 5 to 30 μm. Such coating film can also be stacked into 2 to 3 layers.

One embodiment of stacking the film by drying film method is conducted in a way of hot-pressing and bonding the transparent photosensitive dry film on a transparent base film.

In the aforesaid method, the film is preferably processed by the coating method, and then by drying film method, and preferably by pre-baking. The pre-baking conditions may differ according to the composition and mixing ratio, preferably heating at 70 to 120° C. for 1 to 15 minutes.

The thickness of film after pre-baking is preferably 0.5 to 10 μm, more preferably 1.0 to 7.0 μm.

Step (b) is irradiating at least one part of the film with radiation. When conducting the irradiation, a photomask with a predetermined pattern can be used.

Examples of the radiation for exposure are visible light, ultraviolet light or far-infrared light; wherein the wavelength of radiation is preferably within the range of 250 to 550 nm (including ultraviolet light), more preferably including 365 nm.

Radiation dose (exposure amount) is measuring the radiation intensity at a wavelength of 365 nm by the luxmeter (OAI Model 356, Optical Associates Inc.), and preferably is 100 to 5,000 $J/m^2$, more preferably 200 to 3,000 $J/m^2$.

Step (c) is developing the film after radiating with radiation for removing the unwanted parts and forming a predetermined pattern.

Examples of the developing solution are inorganic base, such as: sodium hydroxide, potassium hydroxide, sodium carbonate, sodium silicate, sodium metasilicate and ammonia; primary aliphatic amine, such as ethylamine and N-propylamine; secondary aliphatic amine, such as diethylamine and N-propylamine; tertiary aliphatic amine, such as trimethylamine, diethylmethyl amine, dimethyl ethyl amine and triethylamine; tertiary alicyclic acid, such as pyrrole, piperidine, N-methylpiperidine, N-methylmorpholine 1,8-diazabicyclo[5.4.0]-7-undecene, 1,5-diazabicyclo[4.3.0]-5-nonene; tertiary aromatic amine, such as pyridine, methylpyrimidine, lutidine and quinoline; quartus ammonium salt alkaline compound, such as tetramethyl ammonium hydroxide and aqueous solution of tetraethyl ammonium hydroxide; water-soluble organic solvent and/or surfactant such as methanol and ethanol, which can be added into aforesaid alkali compounds as needed.

The developing methods like dipping, impregnation or showering methods are preferably conducted at room temperature to 180° C. for 10 seconds.

After development, the desired pattern is cleaned for 30 to 90 seconds via vapor, and dried up via compressed air or nitrogen.

Step (d) is heating the film after development. The obtained film with the desired pattern is heated up to 100 to 250° C. for 30 to 180 minutes (after-baking) via an appropriate heater like a heating plate or oven.

The aforementioned spacer or overcoat with a desired pattern has excellent properties, such as: compressive strength, abrasive resistance of liquid crystal display alignment film and adhesive force of the substrate.

The present invention further provides a liquid crystal display component comprising the thin film as mentioned above.

The photosensitive resin composition according to the present invention preferably form a spacer and an overcoat at least on one side (preferably both sides) in the liquid crystal display component according to the present invention.

The liquid crystal display component according to the present invention can be manufactured by the following two methods.

(1) An overcoat or spacer is formed with the photosensitive resin composition according to the invention on one or both sides of a primary (electrode) transparent substrate having a transparent conductive film on at least one side as mentioned above. Then, an alignment film with liquid crystal alignment is formed on the transparent conductive film having the spacer and/or overcoat. On those base materials, the surface where the alignment film formed is taken as the inner surface, such that liquid crystal orientations of the various alignment films are arranged anti-parallelly or vertically and reversely configured by a certain gap (intercellular space). The liquid crystals are filled into the intercellular space defined by the surface of the base materials (alignment film), and the filling hole is sealed to form a liquid crystal unit. Therefore, the liquid crystal display component with same alignment on the inner and outer surfaces can be formed by the inner and outer liquid crystal units that formed bybonding a vertical polarizer or the liquid crystal polarization arranged on a substrate surface.

(2) An overcoat or spacer is formed with the photosensitive resin composition according to the invention on one or both sides of a primary (electrode) transparent substrate having a transparent conductive film on at least one side as mentioned above. Then, the adhesive hardened by UV-light is coated along the endpoint of the substrate, and the tiny liquid crystals are dropped onto the substrate via a liquid crystal distributor. Next, those substrates is stacked under the vacuum condition and sealed under irradiation of high-pressure mercury lamp which can transmit UV-light. Finally, the liquid crystal display component is formed by bonding the polarizers inside and outside the liquid crystals.

Examples of the liquid crystal display component according to the present invention are of nematic or smectic liquid crystals, preferably nematic liquid crystals such as Shiffs base type liquid crystal, azoxy liquid crystal, biphenyl liquid crystal, phenylcyclohexane liquid crystal, ester liquid crystal, terphenyl liquid crystal, biphenyl cyclohexane liquid crystal, pyrimidine liquid crystal, dioxane polycycloolefinoctane liquid crystal, bicyclooctane liquid crystal, pentacyclo octane liquid crystal, the chloride liquid crystal, cholesteric liquid crystal such as cholesterol carbonate or bile steroidal liquid crystal, and a ferroelectric liquid crystal added with a chiral agent such as p-decyloxy-benzylidene-p-amino-2-methylbutyl cinnamate (C-15, CB-15, Merck Ltd.).

A Polarizer, alignment extension of polyvinyl alcohol, "H film" for absorbing iodine or H film clamped between a cellulose acetate overcoat and a polarizer can be used on the outer side of the liquid crystals.

The following examples are given for the purpose of illustration only and are not intended to limit the scope of the present invention.

EXAMPLE

The alkali-soluble Resin (A) is prepared according to the formulation in Table 1.

Preparation of Alkali-soluble Resin (A-1)

A 1000 ml four-necked flask equipped with a nitrogen inlet, a stirrer, a heater, a condenser and a thermometer was added with the feed composition according to the ratio shown in Table 1 with nitrogen introduced. The feed composition comprises 30.0 parts by weight of methyl methacrylate monomer (hereinafter referred to as MAA), 25.0 parts by weight of glycidyl methacrylate monomer (hereinafter referred to as GMA), 25.0 parts by weight of butyl methacrylate monomer (hereinafter referred to as TBMA) and 20.0 parts by weight of styrene monomer (hereinafter referred to as SM); solvent was 240 parts by weight of diethylene glycol dimethyl ether (hereinafter referred to as diglyme). The manner of feeding the monomer mixtures can be all at once added. The mixture in the flask was then stirred in an oil bath at a temperature of 85° C., and the photoinitiator of 2.4 parts by weight of 2,2'-azobis-2-methylbutyronitrile (hereinafter referred to as AMBN) dissolved in 20 parts by weight of diethylene glycol dimethyl ether was added by five equal amount in one hour interval into the flask. The reaction temperature was maintained at 85° C. in the polymerization process, and the polymerization time was 5.0 hours. After the completion of the polymerization, the polymerization product was taken out from the four-necked flask and the solvent was devolatilized to obtain the alkali-soluble resin A-1.

Preparation of Alkali-soluble Resin (A-2)

A 1000 ml four-necked flask equipped with a nitrogen inlet, a stirrer, a heater, a condenser and a thermometer was added with the feed composition according to the ratio shown in Table 1 with nitrogen introduced. The feed composition comprises 35.0 parts by weight of 2-methacryloyloxyethyl succinate monomer (hereinafter referred to as HOMS), 25.0 parts by weight of 3,4-epoxycyclohexylmethyl methacrylate monomer (hereinafter referred to as EC-MMA), 5.0 parts by weight of 2-hydroxyethyl methacrylate monomer (hereinafter referred to as HEMA), 20.0 parts by weight of dicyclopentanyl methacrylate monomer (hereinafter referred to as FA-13M), and 20.0 parts by weight of styrene monomer (hereinafter referred to as SM); solvent was 240 parts by weight of propylene glycol ethyl ether acetate (hereinafter referred to as PGMEA). The manner of feeding the monomer mixtures can be all at once added. The mixture in the flask was then stirred in an oil bath at a temperature of 80° C., and the photoinitiator of 2.4 parts by weight of 2,2'-azobis(2,4-dimethylvaleronitrile) (hereinafter referred to as ADVN) dissolved in 20 parts by weight of propylene glycol ethyl ether acetate was added by five equal amount in one hour interval into the flask. The reaction temperature was maintained at 80° C. in the polymerization process, and the polymerization time was 6.0 hours. After the completion of the polymerization, the polymerization product was taken out from the four-necked flask and the solvent was devolatilized to obtain the alkali-soluble resin A-2.

Preparation of Alkali-soluble Resin (A-3)

A 1000 ml four-necked flask equipped with a nitrogen inlet, a stirrer, a heater, a condenser and a thermometer was added with the feed composition according to the ratio shown in Table 1 with nitrogen introduced. The feed composition comprises 30.0 parts by weight of methyl methacrylate monomer, 20.0 parts by weight of glycidyl methacrylate monomer, 5.0 parts by weight of 3,4-epoxycyclohexylmethyl methacrylate monomer, 10.0 parts by weight of 2-hydroxyethyl methacrylate monomer, 25.0 parts by weight of benzyl methacrlate (hereinafter referred to as BzMA); solvent was 200 parts by weight of diethylene glycol dimethyl ether and 40 parts by weight of propylene glycol ethyl ether acetate. The manner of feeding the monomer mixtures can be all at once added. The mixture in the flask was then stirred in an oil bath at a temperature of 85° C., and the photoinitiator of 3.0 parts by weight of 2,2'-azobis-2-methylbutyronitrile (hereinafter referred to as AMBN) dissolved in 20 parts by weight of diethylene glycol dimethyl ether was added by five equal amount in one hour interval into the flask. The reaction temperature was maintained at 85° C. in the polymerization process, and the polymerization time was 5.0 hours. After the completion of the polymerization, the polymerization product was taken out from the four-necked flask and the solvent was devolatilized to obtain the alkali-soluble resin A-3.

TABLE 1

| Prepara- | Composition Monomer (mol) | | | | | | | | |
|---|---|---|---|---|---|---|---|---|---|
| tion | MAA | HOMS | GMA | EC-MMA | HEMA | TBMA | FA-513M | BzMA | SM |
| A-1 | 30 |  | 25 |  |  | 25 |  |  | 20 |
| A-2 |  | 35 |  | 20 | 5 |  | 20 |  | 20 |
| A-3 | 30 |  | 20 | 5 | 10 |  |  | 10 | 25 |

TABLE 1-continued

|  | Composition | | | | | |
| --- | --- | --- | --- | --- | --- | --- |
| Prepara- | Solvent (g) | | photoinitiator(g) | | Temp. | Time |
| tion | Diglyme | PGMEA | AMBN | ADVN | (° C.) | (hour) |
| A-1 | 240 |  | 2.4 |  | 85 | 5 |
| A-2 |  | 240 |  | 2.4 | 80 | 6 |
| A-3 | 200 | 40 | 3.0 |  | 85 | 5 |

AMBN 2,2'-azobis-2-methyl butyronitrile
ADVN 2,2'-azobis(2,4-dimethylvaleronitrile)
MAA methacrylic acid
HOMS 2-methacryloyloxyethyl succinate monoester
GMA glycidyl methacylate
EC-MAA 3,4-Epoxycyclohexylmethyl methacrylate
HEMA 2-hydroxyethyl methacrylate
TBMA t-butyl methacrylate
FA-513M dicyclopentanyl methacrylate
BzMA benzyl methacrylate
SM styrene monomer
Diglyme diethylene glycol dimethyl ether
PGMEA Propylene glycol ethyl ether acetate The polysiloxane (B) is prepared according to the formulation in Table 2.

Preparation of Polysiloxane (B-1):

A 500 ml three-necked flask was added with 0.4 mol of methyltrimethoxysilane (hereinafter referred to as MTMS), 0.55 mol of phenyltrimethoxysilane (hereinafter referred to as PTMS), and 0.05 mol of 3-(triethoxysilyl)propyl succinic anhydride (hereinafter referred to as the product name of GF-20); solvent was 100 g of propylene glycol monoethyl ether (hereinafter referred to as PGEE) and 80 g of diacetone alcohol (hereinafter referred to as DAA). Stirring was conducted at room temperature over 30 minutes with the addition of oxalic acid solution (0.40 g of oxalic acid/75 g of water). The mixture in the flask was then stirred in an oil bath at a temperature of 30° C. for 30 minutes. The temperature of the oil bath was raised to 110° C. within a succeeding 30 minutes. After heating for 30 minutes, the temperature of the mixture in the flask reached 110° C. The mixture in the flask was further stirred and heated for 3.0 hours for polycondensation. When the temperature was cooled to the room temperature, 1000 g of acetone was added and the mixture was further stirred for 30 minutes. The precipitate was removed by filtration, and then the solvent was removed by distillation, and the polysiloxane polymer (B-1) was obtained.

Preparation of Polysiloxane (B-2):

A 500 ml three-necked flask was added with 0.4 mol of dimethyldimethoxysilane (hereinafter referred to as DMDMS), and 0.60 mol of phenyltriethoxysilane (hereinafter referred to as PTES); solvent was 180 g of propylene glycol monoethyl ether. Stirring was conducted at room temperature over 30 minutes with the addition of oxalic acid solution (0.45 g of oxalic acid/75 g of water). The mixture in the flask was then stirred in an oil bath at a temperature of 30° C. for 30 minutes. The temperature of the oil bath was raised to 110° C. within a succeeding 30 minutes. After heating for 30 minutes, the temperature of the mixture in the flask reached 110° C. The mixture in the flask was further stirred and heated for 4.5 hours for polycondensation. When the temperature was cooled to the room temperature, 2000 g of ethylbenzene was added and the mixture was further stirred for 30 minutes. The precipitate was removed by filtration, and then the solvent was removed by distillation, and the polysiloxane polymer (B-2) was obtained.

Preparation of Polysiloxane (B-3):

A 500 ml three-necked flask was added with 0.35 mol of methyltrimethoxysilane, 0.4 mol of phenyltrimethoxysilane, 0.2 mol of phenyltriethoxysilane, and 0.05 mol of 3-(triethoxysilyl)propyl succinic anhydride; solvent was 180 g of propylene glycol monoethyl ether. Stirring was conducted at room temperature over 30 minutes with the addition of oxalic acid solution (0.45 g of oxalic acid/75 g of water). The mixture in the flask was then stirred in an oil bath at a temperature of 30° C. for 30 minutes. The temperature of the oil bath was raised to 115° C. within a succeeding 30 minutes. After heating for 30 minutes, the temperature of the mixture in the flask reached 115° C. The mixture in the flask was further stirred and heated for 4.5 hours for polycondensation. When the temperature was cooled to the room temperature, 2000 g of isopropylbenzene was added and the mixture was further stirred for 30 minutes. The precipitate was removed by filtration, and then the solvent was removed by distillation, and the polysiloxane polymer (B-3) was obtained.

Preparation of Polysiloxane (B-4):

A 500 ml three-necked flask was added with 0.4 mol of methyltrimethoxysilane, 0.1 mol of dimethyldimethoxysilane, 0.45 mol of phenyltrimethoxysilane and 0.05 mol of 3-(trimethoxysilyl)propyl glutaric anhydride; solvent was 160 g of propylene glycol monoethyl ether and 10 g of diacetone alcohol. Stirring was conducted at room temperature over 30 minutes with the addition of oxalic acid solution (0.50 g of oxalic acid/75 g of water). The mixture in the flask was then stirred in an oil bath at a temperature of 30° C. for 30 minutes. The temperature of the oil bath was raised to 115° C. within a succeeding 30 minutes. After heating for 30 minutes, the temperature of the mixture in the flask reached 115° C. The mixture in the flask was further stirred and heated for 5.0 hours for polycondensation. When the temperature was cooled to the room temperature, 2000 g of acetone was added and the mixture was further stirred for 30 minutes. The precipitate was removed by filtration, and then the solvent was removed by distillation. Then, 1000 g of acetone was added and the mixture was further stirred for 30 minutes. The precipitate was removed by filtration, and then the solvent was removed by distillation, and the polysiloxane polymer (B-4) was obtained.

Preparation of Polysiloxane (B-5):

A 500 ml three-necked flask was added with 0.45 mol of methyltrimethoxysilane, 0.50 mol of phenyltriethoxysilane, 0.04 mol of 3-(trimethoxysilyl)propyl glutaric anhydride, and 0.01 mol of DMS-S27 (product name, manufactured by Gelest); solvent was 160 g of propylene glycol monoethyl ether. Stirring was conducted at room temperature over 30 minutes with the addition of oxalic acid solution (0.35 g of oxalic acid/75 g of water). The mixture in the flask was then stirred in an oil bath at a temperature of 30° C. for 30 minutes. The temperature of the oil bath was raised to 105° C. within a succeeding 30 minutes. After heating for 30 minutes, the temperature of the mixture in the flask reached 105° C. The mixture in the flask was further stirred and heated for 3.0 hours for polycondensation. When the temperature was cooled to the room temperature, the precipitate was removed by filtration, and then the solvent was removed by distillation, and the polysiloxane polymer (B-5) was obtained.

Preparation of Polysiloxane (B-6):

A 500 ml three-necked flask was added with 0.45 mol of dimethyldimethoxysilane, 0.50 mol of phenyltriethoxysilane and 0.04 mol of 3-(trimethoxysilyl)propyl glutaric anhydride, 0.01 mol of DMS-S27; solvent was 160 g of propylene glycol monoethyl ether. Stirring was conducted at room temperature over 30 minutes with the addition of oxalic acid solution (0.35 g of oxalic acid/75 g of water). The mixture in the flask was then stirred in an oil bath at a temperature of 30° C. for 30 minutes. The temperature of the oil bath was raised to 105° C. within a succeeding 30 minutes. After heating for 30 minutes, the temperature of the mixture in the flask reached 105° C. The mixture in the flask was further stirred and heated for 3.5 hours for polycondensation. When the temperature was cooled to the room temperature, 1500 g of isopropylbenzene was added and the mixture was further stirred for 30 minutes. The precipitate was removed by filtration, and then the solvent was removed by distillation. Then, 1500 g of acetone was added and the mixture was further stirred for 30 minutes. The precipitate was removed by filtration, and then the solvent was removed by distillation, and the polysiloxane polymer (B-6) was obtained.

Preparation of Polysiloxane (B-7):

A 500 ml three-necked flask was added with 0.40 mol of methyltrimethoxysilane, 0.30 mol of phenyltrimethoxysilane, 0.25 mol of phenyltriethoxysilane and 0.04 mol of 3-(trimethoxysilyl)propyl glutaric anhydride, 0.01 mol of 3-ethyl-3-{[3-(trimethoxysilyl)propoxy]methyl}oxetane (hereinafter referred to as TMSOX); solvent was 160 g of propylene glycol monoethyl ether. Stirring was conducted at room temperature over 30 minutes with the addition of oxalic acid solution (0.50 g of oxalic acid/75 g of water). The mixture in the flask was then stirred in an oil bath at a temperature of 30° C. for 30 minutes. The temperature of the oil bath was raised to 120° C. within a succeeding 30 minutes. After heating for 30 minutes, the temperature of the mixture in the flask reached 120° C. The mixture in the flask was further stirred and heated for 6.0 hours for polycondensation. When the temperature was cooled to the room temperature, 2000 g of ethylbenzene was added and the mixture was further stirred for 30 minutes. The precipitate was removed by filtration, and then the solvent was removed by distillation. Then, 2000 g of isopropylbenzene was added and the mixture was further stirred for 30 minutes. The precipitate was removed by filtration, and then the solvent was removed by distillation, and the polysiloxane polymer (B-7) was obtained.

TABLE 2

Contents of Preparation of Polysiloxane (B)

| Preparation | Composition Silane Compound/Siloxane prepolymer (mol) | | | | | | | |
|---|---|---|---|---|---|---|---|---|
| | MTMS | DMDMS | PTMS | PTES | GF-20 | TMSG | TMSOX | DMS-S27 |
| B-1 | 0.40 | | 0.55 | | 0.05 | | | |
| B-2 | | 0.40 | | 0.60 | | | | |
| B-3 | 0.35 | | 0.40 | 0.20 | 0.05 | | | |
| B-4 | 0.40 | 0.10 | 0.45 | | | 0.05 | | |
| B-5 | 0.45 | | | 0.50 | 0.04 | | | 0.01 |
| B-6 | | 0.45 | | 0.50 | 0.04 | | | 0.01 |
| B-7 | 0.40 | | 0.30 | 0.25 | | 0.04 | 0.01 | |

| Preparation | Composition | | | | Temp. (° C.) | Time (hour) | Mw from 5,000 to 50,000 | Oligomers with Mw below 500 |
|---|---|---|---|---|---|---|---|---|
| | Solvent (g) | | Catalyst (g) | | | | | |
| | PGEE | DAA | water | Oxalic acid | | | | |
| B-1 | 100 | 80 | 75 | 0.40 | 110 | 3.0 | 26 | 6 |
| B-2 | 180 | | 75 | 0.45 | 110 | 4.5 | 35 | 4 |
| B-3 | 180 | | 75 | 0.45 | 115 | 4.5 | 42 | 4 |
| B-4 | 160 | 10 | 75 | 0.50 | 115 | 5.0 | 56 | 3 |
| B-5 | 160 | | 75 | 0.35 | 105 | 3.0 | 15 | 9 |
| B-6 | 160 | | 75 | 0.35 | 105 | 3.5 | 16 | 3 |
| B-7 | 160 | | 75 | 0.5 | 120 | 6.0 | 62 | 1 |

| Compound | Name | Mw |
|---|---|---|
| MTMS | Methyltrimethoxysilane | 136 |
| DMDMS | Dimethyldimethoxysilane | 120 |
| PTMS | Phenyltrimethoxysilane | 198 |
| PTES | Phenyltriethoxysilane | 240 |
| GF-20 | 3-(triethoxysilyl)propyl succinic anhydride | 304 |
| TMSG | 3-(trimethoxysilyl)propyl glutaric anhydride | 276 |
| TMSOX | 3-ethyl-3-{[3-(trimethoxysilyl)propoxy]methyl}oxetane | 278 |
| DMS-S27 | Manufactured by Gelest | 1800 |
| PGEE | Propylene glycol monoethyl ether | 104 |
| DAA | Diacetone alcohol | 116 |

Molecular Weight Distribution of Polysiloxane (B):

The molecular weight distribution of polysiloxane was determined by gel permeation chromatography (referred to as GPC) under the following conditions. An integral molecular weight distribution curve was obtained by plotting cumulative weight percentage versus molecular weight falling within a range between 400 and 100,000. The weight percentage of a polysiloxane (B) fraction having a molecular weight ranging from 10,000 to 80,000 was calculated from the integral molecular weight distribution curve.

Measurement Conditions for the GPC:
Apparatus: 717 plus (manufactured by Waters)
Columns: 79911GP-501, 79911GP-502, 79911GP-503, and 79911GP-504 (manufactured by Agilent Technologies)
Detector: 2414 RI Detector (manufactured by Waters)
Mobile Phase: tetrahydrofuran
Flow rate: 1.0 ml/min
Injection Volume: 100 μl
Measurement Temperature: 40° C.
Measurement Period: 60 minutes
Molecular Weight Standard: polystyrene Amount Analysis of Oligomers in the Polysiloxane (B):

The photo-curing polysiloxane (B) was respectively dissolved in acetone, and were analyzed by a gas chromatograph (manufactured by Hewlett Packard; Model No. 5890A) equipped with a flame ionization detector (FID). The results were recorded in wt %.

The results are shown in Table 2.

Preparation of Photosensitive Resin Composition:

The photosensitive resin composition is prepared according to the formulation in Table 3.

Example 1

100 parts by weight of the alkali-soluble resin (A-1); 10 parts by weight of polysiloxane (B-1); 120 parts by weight of the compound having an ethylenically unsaturated group (C-1); 5 parts by weight of the photoinitiator (D-2) and 2 parts by weight of the photoinitiator (D-3) were mixed and dissolved in 750 parts by weight of the solvent (E-1) using a shaker to obtain Example 1 of the blue photosensitive resin composition.

Examples 2 to 7 and Comparative Examples 1 to 4

Examples 2 to 7 and Comparative Examples 1 to 4 of photosensitive resin composition were prepared with the same procedure as in Example 1 except: changing the kind and the amount used of the raw materials, the kind and the amount used of the raw materials was shown in Table 3.

TABLE 3

| | Component | | Example | | | | | | | Comparative Example | | | |
|---|---|---|---|---|---|---|---|---|---|---|---|---|---|
| | | | 1 | 2 | 3 | 4 | 5 | 6 | 7 | 1 | 2 | 3 | 4 |
| alkali-soluble resin (A) (parts by weight) | | A-1 | 100 | | 100 | | 80 | | 100 | | | | 80 |
| | | A-2 | | 100 | | 50 | 20 | 100 | | 100 | | | |
| | | A-3 | | | 100 | | 50 | | | | | 100 | 20 |
| polysiloxane (B) (parts by weight) | | B-1 | 10 | | | 20 | | | | | | | |
| | | B-2 | | 20 | | | | | | | | | |
| | | B-3 | | | 30 | | 30 | 1 | 10 | | | | |
| | | B-4 | | | | 40 | | | 10 | | | | |
| | | B-5 | | | | | | | | 30 | | | |
| | | B-6 | | | | | | | | | 30 | | |
| | | B-7 | | | | | | | | | | | 30 |
| compound having an ethylenically unsaturated group (C) (parts by weight) | | C-1 | 120 | | 140 | | | 120 | 130 | | | | |
| | | C-2 | | 110 | | | 40 | 110 | | | 100 | 130 | |
| | | C-3 | | | 130 | 100 | | | | | 20 | | 130 |
| photoinitiator (D) (parts by weight) | | D-1 | | 2 | | | 10 | 5 | 2 | | | | 7 |
| | | D-2 | 5 | 5 | 7 | 10 | | 5 | | 5 | 6 | 5 | |
| | | D-3 | 2 | | | | | | | | | 2 | |
| solvent (E) (parts by weight) | | E-1 | 750 | | | 300 | | 650 | | 900 | 600 | | |
| | | E-2 | | 800 | 900 | 600 | 600 | | 950 | | | 900 | 900 |
| | | E-3 | | | | | 400 | | | | 300 | | |
| additivies (F) (parts by weight) | surfactant | F-1 | | | | | | 5 | | | | | |
| | adhesion improving agent | F-2 | | | 5 | | | | | | | | |
| Assay | | heat-resistant transmittance | ○ | ○ | ○ | ○ | ○ | ○ | ○ | Δ | Δ | Δ | X |
| | | chemical resistance | ○ | ○ | ○ | ○ | ○ | ○ | ○ | X | X | ○ | X |
| | | elastic recovery rate | ○ | ○ | ○ | ○ | ○ | ○ | ○ | X | Δ | X | Δ |
| | | development | ○ | Δ | ○ | ○ | ○ | ○ | ○ | ○ | ○ | ○ | ○ |

| Component | Name | Manufactured by |
|---|---|---|
| C-1 | Dipentaerythritol hexaacrylate | Toagosei |
| C-2 | Dipentaerythritol tetraacrylate | Toagosei |
| C-3 | glycerol triacrylate, modified PO | |
| D-1 | 1-[4-(phenylthio)phenyl]-octane-1,2-dione 2-(O-benzoyloxine) | BASF |
| D-2 | 2-Methyl-1-[4-(methylthio)phenyl]-2-morpholino-1-propanone | BASF |
| D-3 | 4,4'-bis(diethylamino)benzophenone | |
| E-1 | Propylene glycol monoethyl ether acetate | |
| E-2 | diethylene glycol dimethyl ether | |
| E-3 | ethyl 3-ethoxypropionate | |

TABLE 3-continued

| | | |
|---|---|---|
| F-1 | SF-8427 | Toray Dow Corning Silicon |
| F-2 | 3-glycidoxypropyltrimethoxysilane | Shin-Etsu |

Overcoat Formation

The photosensitive resin composition was spin-coated on a glass substrate to form a film having a thickness of 2.0 μm. The film was pre-baked at 90° C. for 2 min. The pre-baked film was exposed (100 mJ/cm$^2$), and the exposed film was immersed in 0.045% of KOH solution for 50 seconds to remove the un-exposed portions. The film was then washed with water and post-baked at 235° C. for 30 min to obtain the overcoat on the substrate.

Spacer Formation

The photosensitive resin composition was spin-coated on a glass substrate to form a film having a thickness of 2.0 μm. The film was pre-baked at 90° C. for 2 min. The pre-baked film was positioned between the designed pattern of the mask and exposed by UV(100 mJ/cm$^2$), and the exposed film was immersed in 0.045% of KOH solution for 50 seconds to remove the un-exposed portions. The film was then washed with water and post-baked at 235° C. for 30 min to obtain the spacer on the substrate.

Assay

Heat-resistance transmittance measurement method: After forming the overcoat or spacer (after pre-bake), the film was placed and baked in the oven at 235° C. for 3 hours for measuring the transmittance.

Machine: MCPD-2000/Otsuka Science and Technology Co., Ltd.

Rate of transmittance >90%: ○
80%<Rate of transmittance <90%: Δ
Rate of transmittance <80%: x Chemical resistance measurement method: After forming the overcoat or spacer (after pre-bake), the film was soaked in NMP at 45° C. for 6 minutes, and the thickness change rate can be obtained by the formula=(thickness before soaked−thickness after soaked)/thickness before soaked.

−1%<thickness change rate <3%: ○
3%<thickness change rate <6%: Δ
thickness change rate >6% or thickness change rate <−1%: x Elastic recovery rate measurement method: The obtained spacer (a cylinder with 25 micron diameter and 3.5 μm height) was loaded by 100 mN for 5 seconds with a micro compression tester (trade name as DUH-201, made by Shimadzu Co., Ltd) and an indenter of 50 micron diameter with 4.413 mN/sec of loading and unloading rate, and then unloaded. The loading-deformation curve and unloading-deformation curve was obtained. At the moment, L1 represents the deformation difference of loading 100 mN and 5 mN; L2 represents the deformation difference of unloading 100 mN and 5 mNg; so that the elastic recovery rate was calculated by the following formula:

Elastic recovery rate(%)=L2×100/L1
Elastic recovery rate >70%: ○
50%<Elastic recovery rate <70%: Δ
Elastic recovery rate <50%: x Development measurement method: The completement of the pattern of the overcoat and spacer formed on the glass substrate was observed.

○: line of the pattern is smooth
Δ: line of the pattern is not smooth with slight burr or off
X: line of the pattern is not smooth with severe burr or off The results are shown in Table 3. As shown, when compared with Comparative Examples, Examples of the photosensitive composition according to the invention can form an overcoat and spacer with good heat-resistance transmittance, chemical resistance and elastic recovery rate in the same manufacture condition.

While embodiments of the present invention have been illustrated and described, various modifications and improvements can be made by persons skilled in the art. It is intended that the present invention is not limited to the particular forms as illustrated, and that all modifications not departing from the spirit and scope of the present invention are within the scope as defined in the following claims.

What is claimed is:

1. A photosensitive resin composition comprising:
an alkali-soluble resin (A);
a polysiloxane (B)
a compound having an ethylenically unsaturated group (C); and
a photoinitiator (D);
wherein said polysiloxane (B) contains 20 wt % to 60 wt % of a polysiloxane fraction having a molecular weight ranging from 5,000 to 50,000 based on a total weight of said polysiloxane (B) and said polysiloxane (B) contains 0.001 wt % to 7 wt % of a polysiloxane fraction having a molecular weight below 500 based on a total weight of said polysiloxane (B) when calculated from an integral molecular weight distribution curve obtained by plotting cumulative weight percentage versus molecular weight falling within a range between 400 and 100,000 measured by gel permeation chromatography;
wherein the polysiloxane (B) is obtained by hydrolyzing and condensing a silane compound represented by Formula (1);

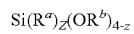
$$Si(R^a)_z(OR^b)_{4-z} \qquad \text{Formula (1)}$$

wherein:
at least one of $R^a$ represents an alkyl group having a carboxylic acid anhydride substituent; and the other $R^a$ is independently selected from the group consisting of a hydrogen atom, a $C_1$-$C_{10}$ alkyl group, a $C_2$-$C_{10}$ alkenyl group, and a $C_6$-$C_{15}$ aryl group;
$R^b$ is independently selected from the group consisting of a hydrogen atom, a $C_1$-$C_6$ alkyl group, a $C_1$-$C_6$ acyl group, and a $C_6$-$C_{15}$ aryl group; and
z represents an integer from 1 to 3.

2. The photosensitive resin composition according to claim 1, wherein the measurement condition for the gel permeation chromatography uses an apparatus, columns, a detector, a mobile phase of tetrahydrofuran, a flow rate of 1.0 ml/min, a injection volume of 100 μL, measurement temperature of 40° C., a measurement period of 60 minutes, and a molecular weight standard of polystyrene.

3. The photosensitive resin composition according to claim 1, wherein the alkali-soluble resin (A) is polymerized with an unsaturated carboxylic acid or unsaturated carboxylic acid anhydride compound (a1), an unsaturated compound containing an epoxy group (a2), and/or an other unsaturated compound (a3).

4. The photosensitive resin composition according to claim 1, wherein the amount of the polysiloxane (B) used is from 1 to 50 parts, and the amount of the compound having an ethylenically unsaturated group (C) used is from 5 to 220 parts by weight based on 100 parts by weight of the alkali-soluble resin (A) used.

5. The photosensitive resin composition according to claim 1, wherein the photoinitiator (D) used is from 1 to 60 parts based on 100 parts by weight of the compound having an ethylenically unsaturated group (C) used.

6. A method for forming a thin film on a substrate comprising applying the photosensitive resin composition according to claim 1 on the substrate.

7. The method according to claim 6, wherein the measurement condition for the gel permeation chromatography uses an apparatus, columns, a detector, a mobile phase of tetrahydrofuran, a flow rate of 1.0 ml/min, a injection volume of 100 μL, a measurement temperature of 40° C., a measurement period of 60 minutes, and a molecular weight standard of polystyrene.

8. The method according to claim 6, wherein the alkali-soluble resin (A) is polymerized with an unsaturated carboxylic acid or unsaturated carboxylic acid anhydride compound (a1), an unsaturated compound containing an epoxy group (a2), and/or an other unsaturated compound (a3).

9. The method according to claim 6, wherein the amount of the polysiloxane (B) used is from 1 to 50 parts, and the amount of the compound having an ethylenically unsaturated group (C) used is from 5 to 220 parts by weight based on 100 parts by weight of the alkali-soluble resin (A) used.

10. The method according to claim 6, wherein the photoinitiator (D) used is from 1 to 60 parts based on 100 parts by weight of the compound having an ethylenically unsaturated group (C) used.

11. A thin film on a substrate, which is obtained by the method according to claim 6.

12. The thin film according to claim 11, which is an overcoat or a spacer for a liquid crystal display component.

13. A liquid crystal display component comprising the thin film according to claim 11.

14. A liquid crystal display component comprising the thin film according to claim 12.

* * * * *